(12) United States Patent
Hein et al.

(10) Patent No.: US 12,214,754 B2
(45) Date of Patent: Feb. 4, 2025

(54) HEATABLE DEVICE FOR USE WITH A VEHICLE MOUNTED IMAGE ACQUISITION UNIT

(71) Applicant: MOTHERSON INNOVATIONS COMPANY LIMITED, London (GB)

(72) Inventors: Peter Hein, Stuttgart (DE); Alexandru Dobrete, Stuttgart (DE); Ivan Batinic, Stuttgart (DE)

(73) Assignee: Motherson Innovations Company Limited, London (GB)

(*) Notice: Subject to any disclaimer, the term of this patent is extended or adjusted under 35 U.S.C. 154(b) by 917 days.

(21) Appl. No.: 17/313,168

(22) Filed: May 6, 2021

(65) Prior Publication Data

US 2021/0253065 A1 Aug. 19, 2021

Related U.S. Application Data

(63) Continuation-in-part of application No. PCT/EP2019/077092, filed on Oct. 7, 2019, which is
(Continued)

(51) Int. Cl.
*B60S 1/02* (2006.01)
*G02B 7/02* (2021.01)
(Continued)

(52) U.S. Cl.
CPC .............. *B60S 1/026* (2013.01); *G02B 7/028* (2013.01); *G02B 27/0006* (2013.01); *H05B 3/03* (2013.01); *H05B 3/84* (2013.01); *H05B 2203/013* (2013.01)

(58) Field of Classification Search
CPC ..... B60R 11/04; B60S 1/026; G02B 27/0006; G02B 27/028; G03B 17/55;
(Continued)

(56) References Cited

U.S. PATENT DOCUMENTS

| 4,755,659 A | 7/1988 | Leon et al. |
| 5,071,692 A | 12/1991 | Jourdaine |

(Continued)

FOREIGN PATENT DOCUMENTS

| EP | 3735105 A1 | 11/2004 |
| JP | H07 38788 A | 2/1995 |

(Continued)

OTHER PUBLICATIONS

UK Intellectual Property Office, Office Action, Appl. No. GB2206592.4, dated Oct. 20, 2022.

(Continued)

*Primary Examiner* — Joe E Mills, Jr.
(74) *Attorney, Agent, or Firm* — Jones Day

(57) ABSTRACT

A heatable device for use with a vehicle-mounted image acquisition unit includes a main body including a first end, a second end opposite the first end, an interior cavity defined therein extending between the first and second ends, and a receiving portion disposed at the second end, the receiving portion including an opening therein providing access to the interior cavity, a transparent glass substrate fixed to the main body at the first end and including a transparent electrically-conductive coating on an inner surface thereof or the glass with contact foil stripes without a transparent electrically-conductive coating, the inner surface of the transparent glass substrate facing the first end of the main body, and at least one electrically-conductive unit disposed at least partially outside of the interior cavity defined in the main body.

46 Claims, 16 Drawing Sheets

Related U.S. Application Data a continuation of application No. 16/181,740, filed on Nov. 6, 2018, now Pat. No. 11,453,366.

(51) Int. Cl.
  *G02B 27/00* (2006.01)
  *H05B 3/03* (2006.01)
  *H05B 3/84* (2006.01)

(58) Field of Classification Search
  CPC ........ H05B 2203/011; H05B 2203/013; H05B 2203/016; H05B 2214/02; H05B 3/03; H05B 3/06; H05B 3/84
  See application file for complete search history.

(56) References Cited

U.S. PATENT DOCUMENTS

| | | | |
|---|---|---|---|
| 5,703,352 A | 12/1997 | Snoeren et al. | |
| 2011/0115972 A1 | 5/2011 | Voges | |
| 2019/0033690 A1* | 1/2019 | Choi | ........... G02B 27/0006 |

FOREIGN PATENT DOCUMENTS

| WO | WO 2004/009350 A1 | 1/2004 |
|---|---|---|
| WO | WO 2005/033772 A1 | 4/2005 |
| WO | WO 2009/031130 A1 | 3/2009 |
| WO | WO 2017/115074 A1 | 7/2017 |
| WO | WO 2017/142203 A1 | 8/2017 |
| WO | WO 2020/094316 A1 | 5/2020 |

OTHER PUBLICATIONS

International Search Report dated Jan. 17, 2020 of International application No. PCT/EP2019/077092.

Written Opinion dated Jan. 17, 2020 of International application No. PCT/EP2019/077092.

* cited by examiner

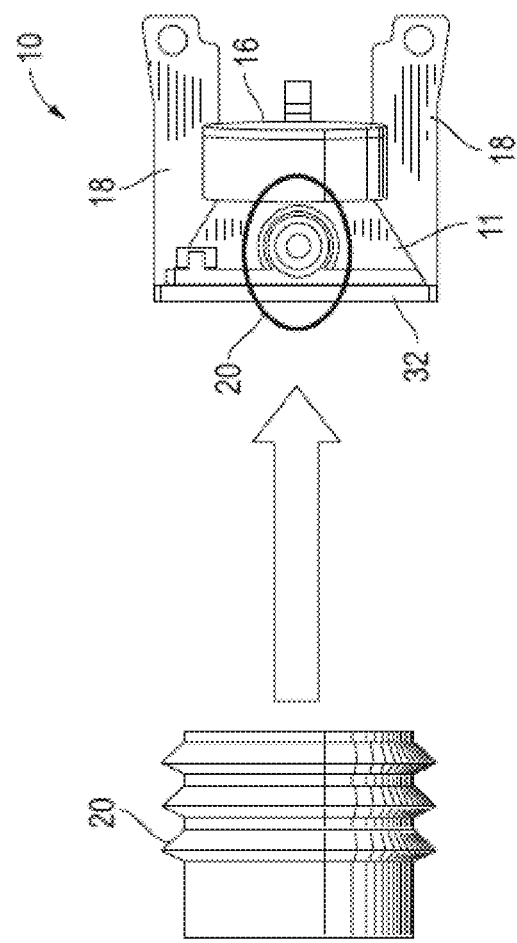
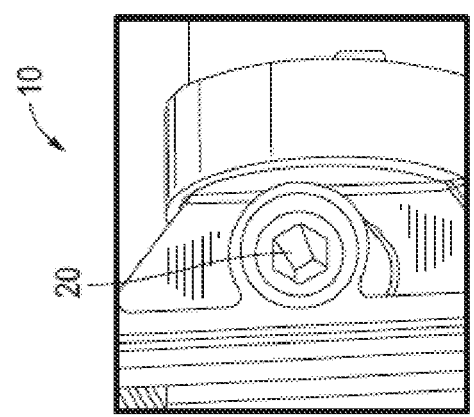
FIG. 3

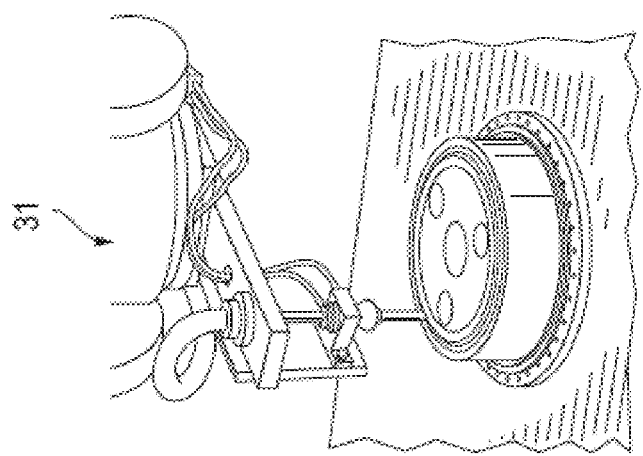
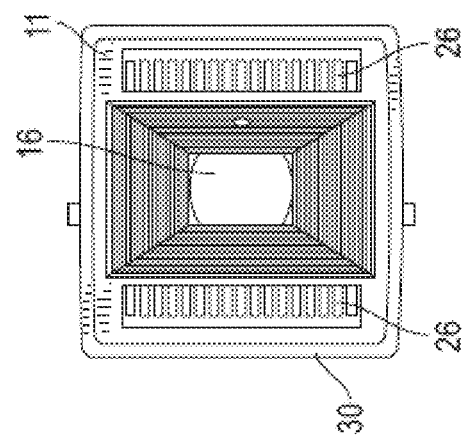
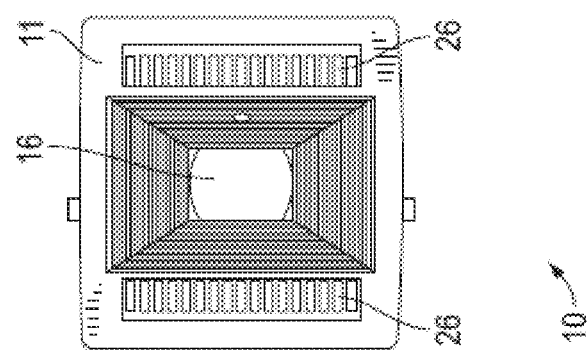
FIG. 10

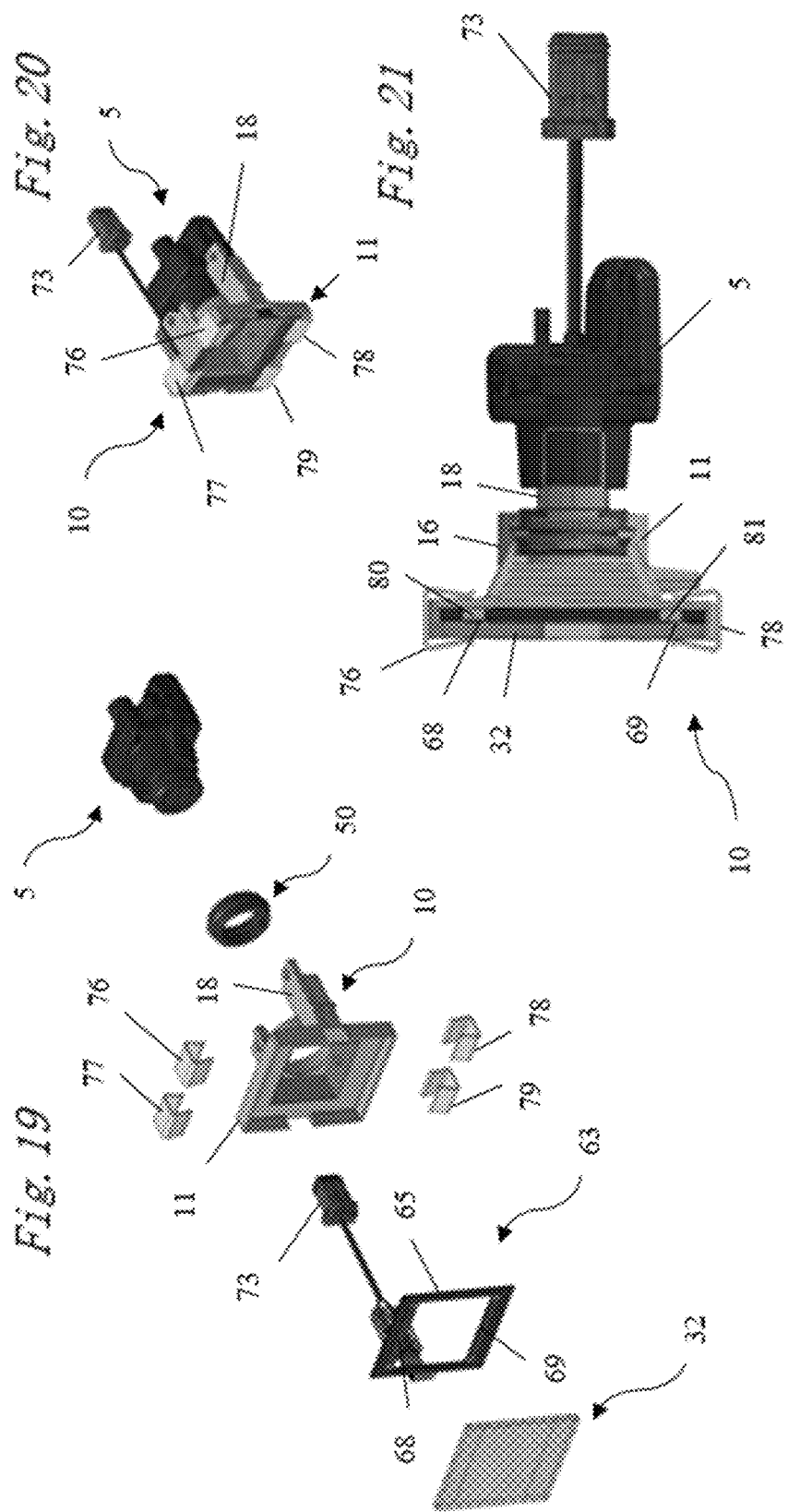

HEATABLE DEVICE FOR USE WITH A VEHICLE MOUNTED IMAGE ACQUISITION UNIT

CROSS-REFERENCE TO RELATED APPLICATION

This application is a continuation-in-part of International Patent Application No. PCT/EP2019/077092, filed Oct. 7, 2019, which claims the benefit of priority to U.S. patent application Ser. No. 16/181,740, filed Nov. 6, 2018, each of which is hereby incorporated by reference in its entirety for all purposes.

BACKGROUND

1. Field of the Invention

The present disclosure relates generally to image acquisition units for vehicles and, more particularly, to a heatable device for use with a vehicle-mounted image acquisition unit, an image acquisition unit including the heatable device, a vehicle including the heatable device and image acquisition unit, and a method of making the heatable device.

2. Related Art

Some vehicles may employ one or more cameras or other vehicle-mounted image acquisition units for acquiring images or a real-time view of the environment surrounding the vehicle. Such acquired images, or information relating thereto, are often transmitted to a display, a vehicle control unit, or to the driver by various means in order to make the driver aware of their surroundings while driving or to impact control of the vehicle automatically or manually. Thus, such images or information acquired by one or more vehicle-mounted image acquisition units are often important for assisting the driver and to maintain the safe operation of the vehicle.

To ensure that accurate and/or unobstructed images of the environment surrounding a vehicle are captured or otherwise acquired, cameras or other vehicle-mounted image acquisition units may make use of attachments which are capable of performing various desired functions. For example, a wide angle lens attachment may be added to a vehicle-mounted image acquisition unit in order to provide a wider angle image. Other functions of such attachments may include cleaning of a lens or member used to acquire an image, heating of a lens or member used to acquire an image, etc. However, at the present time, there is currently an unaddressed need for a device, such as an attachment, for use with a vehicle-mounted image acquisition unit which provides comprehensive heating, sealing and wide viewing angle functionalities in a combined, easy to manufacture, and cost-effective manner.

SUMMARY

At least the above-identified need is met with the present disclosure. In one aspect, a heatable device for use with a vehicle-mounted image acquisition unit is disclosed. The heatable device includes a main body including a first end, a second end opposite the first end, an interior cavity defined therein extending between the first and second ends, and a receiving portion disposed at the second end. The receiving portion of the main body includes an opening therein providing access to the interior cavity. The heatable device further includes a transparent glass substrate fixed to the main body at the first end and including a transparent electrically-conductive coating on an inner surface thereof, the inner surface of the transparent glass substrate facing the first end of the main body. The heatable device further includes at least one electrically-conductive unit disposed at least partially outside of the interior cavity defined in the main body and contacting the transparent electrically-conductive coating on the inner surface of the transparent glass substrate. The at least one electrically-conductive unit is configured to receive electric current selectively provided by a vehicle-mounted power supply and conduct the electric current to the transparent electrically-conductive coating on the inner surface of the transparent glass substrate, thereby selectively heating the transparent glass substrate. The heatable device further includes a sealing member configured to couple the opening in the receiving portion of the main body with at least a portion of a vehicle-mounted image acquisition unit such that the interior cavity defined in the main body is hermetically sealed and the vehicle-mounted image acquisition unit has a field of view extending through the interior cavity and through the transparent glass substrate to an outside environment surrounding a vehicle.

The transparent glass substrate may be fixed to the main body by way of a non-conductive adhesive.

The non-conductive adhesive may be a non-conductive ultraviolet (UV) light curable adhesive.

The non-conductive adhesive may comprise at least one non-conductive double-sided adhesive member.

The non-conductive adhesive may be disposed between the inner surface of the transparent glass substrate and a peripheral face of the main body, the peripheral face surrounding an opening of the interior cavity at the first end of the main body.

The transparent electrically-conductive coating on the inner surface of the transparent glass substrate may be an indium-tin-oxide (ITO) electrically-conductive coating.

The transparent electrically-conductive coating on the inner surface of the transparent glass substrate may be an electrically-conductive resistance heating coating.

The transparent glass substrate may further include a transparent anti-reflective (AR) coating on at least a portion of the inner surface thereof.

The at least one electrically-conductive unit may contact the transparent electrically-conductive coating on at least one contact portion of the inner surface of the transparent glass substrate, the at least one contact portion devoid of the transparent anti-reflective (AR) coating.

The at least one electrically-conductive unit may include at least two electrically-conductive units, the at least two electrically-conductive units contacting the transparent electrically-conductive coating on at least two contact portions of the inner surface of the transparent glass substrate which correspond to the at least two electrically-conductive units, respectively, with the at least two contact portions being devoid of the transparent anti-reflective (AR) coating.

The transparent glass substrate may further include an anti-reflective (AR) coating on an outer surface thereof, the outer surface of the transparent glass substrate facing away from the first end of the main body.

The transparent glass substrate may further include a transparent anti-reflective (AR) coating on at least a portion of the inner surface thereof and an anti-reflective (AR) coating on an outer surface thereof opposite the inner surface of the transparent glass substrate.

The transparent glass substrate may include a borosilicate glass or a borosilicate float glass.

In response to the transparent glass substrate being selectively heated, the transparent glass substrate may be capable of reducing or eliminating at least one or more of fog, frost, snow, ice, water, and moisture on an outer surface thereof, the outer surface of the transparent glass substrate facing away from the first end of the main body.

The at least one electrically-conductive unit may include a busbar disposed on the main body.

The busbar may include a material selected from the group consisting of silver, copper, copper-beryllium, gold, aluminum, zinc, nickel, brass, bronze, and combinations thereof.

An electrically-conductive contact spring can be compressed between the busbar and the inner surface of the transparent glass substrate, the electrically-conductive contact spring contacting the transparent electrically-conductive coating on the inner surface of the transparent glass substrate.

The electrically-conductive contact spring may include a material selected from the group consisting of silver, copper, copper-beryllium, gold, aluminum, zinc, nickel, brass, bronze, and combinations thereof.

An electrically-conductive adhesive can be disposed between the busbar and the inner surface of the transparent glass substrate, the electrically-conductive adhesive contacting the transparent electrically-conductive coating on the inner surface of the transparent glass substrate.

The at least one electrically-conductive unit may include at least two electrically-conductive units disposed on the main body. The at least two electrically-conductive units each can comprise a busbar.

The main body may further include a peripheral face facing the inner surface of the transparent glass substrate, the peripheral face surrounding an opening of the interior cavity at the first end of the main body and including at least two spaced-apart recesses therein, and the at least two electrically-conductive units are disposed within the at least two spaced-apart recesses in the peripheral face, respectively.

The at least two electrically-conductive units may each include a busbar and an electrically-conductive contact spring compressed between the busbar and the inner surface of the transparent glass substrate, the electrically-conductive contact spring contacting the transparent electrically-conductive coating on the inner surface of the transparent glass substrate.

The busbar may include a material selected from the group consisting of silver, copper, copper-beryllium, gold, aluminum, zinc, nickel, brass, bronze, and combinations thereof.

The electrically-conductive contact spring may include a material selected from the group consisting of silver, copper, copper-beryllium, gold, aluminum, zinc, nickel, brass, bronze, and combinations thereof.

The at least two electrically-conductive units may each include a busbar and an electrically-conductive adhesive disposed between the busbar and the inner surface of the transparent glass substrate, the electrically-conductive adhesive contacting the transparent electrically-conductive coating on the inner surface of the transparent glass substrate.

The busbar may include a material selected from the group consisting of silver, copper, copper-beryllium, gold, aluminum, zinc, nickel, brass, bronze, and combinations thereof.

The at least one electrically-conductive unit may include first and second electrically-conductive units.

In one embodiment the heatable device is further defined in that the at least one electrically-conductive unit comprises first and second electrically-conductive units; the heatable device further comprises a one-piece assembly comprising: at least one non-conductive carrier supporting the first and second electrically-conductive units on an outer surface of the non-conductive carrier; and a first non-conductive double-sided adhesive member fixed to the outer surfaces of the at least one non-conductive carrier, and a second non-conductive double-sided adhesive member fixed to inner surface of the at least one non-conductive carrier opposite the outer surface thereof, wherein the first non-conductive double-sided adhesive member is further fixed to the inner surface of the transparent glass substrate and the second non-conductive double-sided adhesive member is further fixed to a peripheral face of the main body surrounding an opening of the interior cavity at the first end of the main body, thereby fixing the transparent glass substrate to the main body at the first end.

Embodiments can be further specified in that the second non-conductive double-sided adhesive member covers the non-conductive carrier and the first and second electrically-conductive units, in particular a first and a second busbar, and the first non-conductive double-sided adhesive member covers only the non-conductive carrier.

It is also proposed that the first and second busbars have a thickness of at least the thickness of the first non-conductive double-sided adhesive member; and/or the first and second busbars each have a crimped contact to a wire harness connector, preferably the crimped contacts being covered by a crimp contact protection.

Embodiments of the invention can be further defined in that at least one pressure pad is arranged between the first and second busbars and the main body, and/or at least one clips is securing the attachment of the transparent glass substrate and the main body.

There are further embodiments of the invention, defined in that a first non-conductive carrier supports the first electrically-conductive unit on an outer surface of the first non-conductive carrier and a second non-conductive carrier supports the second electrically-conductive unit on an outer surface of the second non-conductive carrier; the first non-conductive double-sided adhesive member overlays the first and second electrically-conductive units and brides the first and second non-conductive carriers; and the second non-conductive double-sided adhesive member is fixed to inner surfaces of the first and second non-conductive carriers opposite the outer surfaces of the first and second non-conductive carriers, the second non-conductive double-sided adhesive member further bridging the first and second non-conductive carriers.

The first and second electrically-conductive units may include first and second metallic busbars screen-printed on the outer surfaces of the respective first and second non-conductive carriers, the metallic busbars each including a layer of electrically-conductive adhesive disposed thereon and contacting the transparent electrically-conductive coating on the inner surface of the transparent glass substrate.

The first and second metallic busbars may each include a material selected from the group consisting of silver, copper, copper-beryllium, gold, aluminum, zinc, nickel, brass, bronze, and combinations thereof.

The first and second non-conductive double-sided adhesive members may each include double-sided adhesive tape or a screen-printed adhesive layer.

The main body may be substantially cone-shaped such that at least two opposing surfaces of the interior cavity diverge relative to one another from the second end of the main body toward the first end of the main body, thereby permitting the vehicle-mounted image acquisition unit to have a wide field of view extending through the interior cavity and through the transparent glass substrate to the outside environment surrounding the vehicle.

The main body may further include at least one attachment arm extending from an outer surface of the main body proximate the first end toward the second end of the main body, the at least one attachment arm configured to attach to the vehicle-mounted image acquisition unit to secure the vehicle-mounted image acquisition unit to the heatable device.

The main body may further include at least two attachment arms extending from an outer surface of the main body proximate the first end toward the second end of the main body, the at least two attachment arms configured to attach to the vehicle-mounted image acquisition unit to secure the vehicle-mounted image acquisition unit to the heatable device.

The main body may include a material selected from the group consisting of glass-filled nylon, nylon 66, polycarbonate (PC), acrylonitrile butadiene styrene (ABS), and polycarbonate-acrylonitrile butadiene styrene (PC-ABS).

The main body may further include a breather vent extending between the interior cavity and an outer surface of the main body, the breather vent including a breathable membrane seated therein, the breathable membrane configured to permit moisture or vapor within the interior cavity to escape the interior cavity while prohibiting moisture or vapor outside of the interior cavity from re-entering the interior cavity through the breathable membrane.

The breathable membrane may include polytetrafluoroethylene (PTFE).

The sealing member may include a rubber or a thermoplastic elastomer (TPE).

The sealing member may include a grommet.

The vehicle-mounted image acquisition unit may be selected from the group consisting of cameras, sensors, image sensors, optical sensors, laser sensors, and scanners.

In another aspect, a vehicle includes the heatable device.

The heatable device may be mounted to an exterior portion of the vehicle.

In another aspect, a heatable device for use with a vehicle-mounted image acquisition unit includes a main body including a first end, a second end opposite the first end, an interior cavity defined therein extending between the first and second ends, and a receiving portion disposed at the second end, the receiving portion including an opening therein providing access to the interior cavity, a transparent glass substrate fixed to the main body at the first end, one or more electro-conductive foil strips on an inner surface of the transparent glass substrate, wherein the one or more foil strips comprise a UV activated adhesive and the inner surface of the transparent glass substrate faces the first end of the main body, at least one electrically-conductive unit disposed at least partially outside of the interior cavity defined in the main body and contacting the one or more foil strips on the inner surface of the transparent glass substrate, the at least one electrically-conductive unit configured to receive electric current selectively provided by a vehicle-mounted power supply and conduct the electric current to the one or more foil strips on the inner surface of the transparent glass substrate, thereby selectively heating the transparent glass substrate, one or more contact support foil strips on the transparent glass substrate placed parallel over the electrically-conductive side of the transparent glass substrate, wherein the one or more contact support foil strips comprise a UV activated adhesive, a sealing member configured to couple the opening in the receiving portion of the main body with at least a portion of a vehicle-mounted image acquisition unit such that the interior cavity defined in the main body is hermetically sealed and the vehicle-mounted image acquisition unit has a field of view extending through the interior cavity and through the transparent glass substrate to an outside environment surrounding a vehicle.

The one or more contact support foil strips may each have a gap clearance being spaced from an edge of the glass substrate by about 1.5 mm, and each of the one or more contact support foil strips may have a width of about 4 mm.

The glass substrate may be fixed to the heatable device by pressing the glass substrate into the heatable device and providing a continuous bead of glue dispensed around edges of the glass substrate and the heatable device in one or more slots on a perimeter of the heatable device, the glue including a UV activated adhesive and/or the glass substrate may be pressed into the heatable device by a force of about 30 N.

The UV activated adhesive may be configured to be activated by a DELO UV light which is applied for a duration of 45 seconds at 80% power setting.

The device may further include one or more busbars and one or more busbar slots which are sealed with a UV activated adhesive without covering a contact area at an edge of each of the busbars.

The UV activated adhesive may be configured to be activated by a UV light which is applied for 20 sec at 50% power setting.

The device may further include a heat sink pad which is attached to a bottom surface of the heatable device.

The device may further include the image acquisition unit, where the heatable device comprises one or more alignment holes and the image acquisition unit comprises one or more alignment holes, and the image acquisition unit is attached by being pushed into the heatable device until the one or more alignment holes of the image acquisition unit are aligned with the one or more alignment holes of the heatable device.

The heatable device may be attached to the image acquisition unit using a UV activated adhesive positioned between the heatable device and the image acquisition unit, the UV activated adhesive may be configured to be activated by a UV light which is applied for 20 sec at 50% power setting.

The device may be mounted to an exterior portion of a vehicle.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 3 provides multiple views illustrating a breathable membrane seated within a breather vent of the main body of the heatable device;

FIG. 10 provides multiple front views of the main body of the heatable device illustrating a non-conductive adhesive applied to the peripheral face of the main body and an exemplary apparatus capable of applying the non-conductive adhesive;

FIG. 19 is an explosion view of the one-piece assembly of FIG. 18 together with a main body, a sealing member and an image acquisition unit;

FIG. 20 is a perspective view of the heatable device of FIG. 19, assembled;

FIG. 21 is a side view of the heatable device of FIG. 20;

FIGS. 24-30 illustrate another example of a heatable device and a method of assembly thereof. FIG. 24 shows contact-support foil strips added to a cover glass. FIGS. 25 and 26 show assembly of the glass part and a cone. FIG. 27 illustrates the glass part after it is assembled. FIG. 28 shows a busbar and busbar slots. FIG. 30 illustrates the attachment of a heat sink pad to the camera.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of describing the present disclosure and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the present disclosure or the appended claims. Further, it should be understood that any one of the features can be used separately or in combination with other features. Other systems, methods, features, and advantages of the present disclosure will be or become apparent to those skilled in the art upon examination of the description. It is intended that all such additional systems, methods, features, and advantages be included within this description, be within the scope of the present disclosure, and be protected by the accompanying claims.

Figure 1:
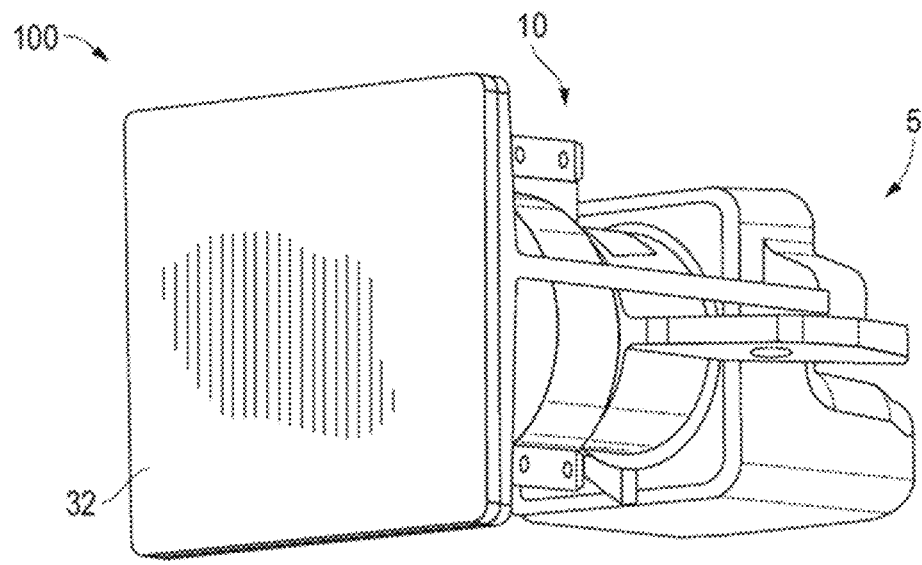
FIG. 1 is a perspective view of an exemplary assembly for mounting to a vehicle, the assembly including an image acquisition unit with a heatable device coupled thereto.

FIG. 1 is a perspective view of an exemplary assembly 100 which may be mounted to a vehicle (such as an exemplary vehicle 300 shown in FIG. 19). The assembly 100 may include an image acquisition unit 5 with a heatable device 10 coupled thereto.

Referring to FIG. 1, the assembly 100 is illustrated which includes the image acquisition unit 5 and the heatable device 10. The image acquisition unit 5 may be coupled to the heatable device 10 (as will be further described herein) so that a field of view of the image acquisition unit 5 extends through a main body 11 of the heatable device 10. As non-limiting examples, the image acquisition unit 5 may be selected from the group consisting of cameras, sensors, image sensors, optical sensors, laser sensors, and scanners.

In a preferred embodiment, the heatable device 10 may be configured to permit a wide field of view of the image acquisition unit 5, protect at least a portion of the image acquisition unit 5 from debris and the outside environment by providing a hermetically sealed interior cavity 14 defined in the main body 11, and provide a heatable member 32. In this case, the heatable member 32 of the heatable device 10 is a transparent glass substrate 32 that may be selectively heated (as will be further described herein). In response to being selectively heated, the transparent glass substrate 32 may be capable of reducing or eliminating fog, frost, snow, ice, water, and moisture on an outer surface thereof, the outer surface of the transparent glass substrate 32 facing away from an end of the main body 11 of the heatable device 10. While the transparent glass substrate 32 is described as being transparent, the transparent glass substrate 32 is not limited thereto. The transparent glass substrate 32, including the fixing of the transparent glass substrate 32 to the heatable device 10, is described in detail below with reference to FIGS. 4-12.

Figure 2:
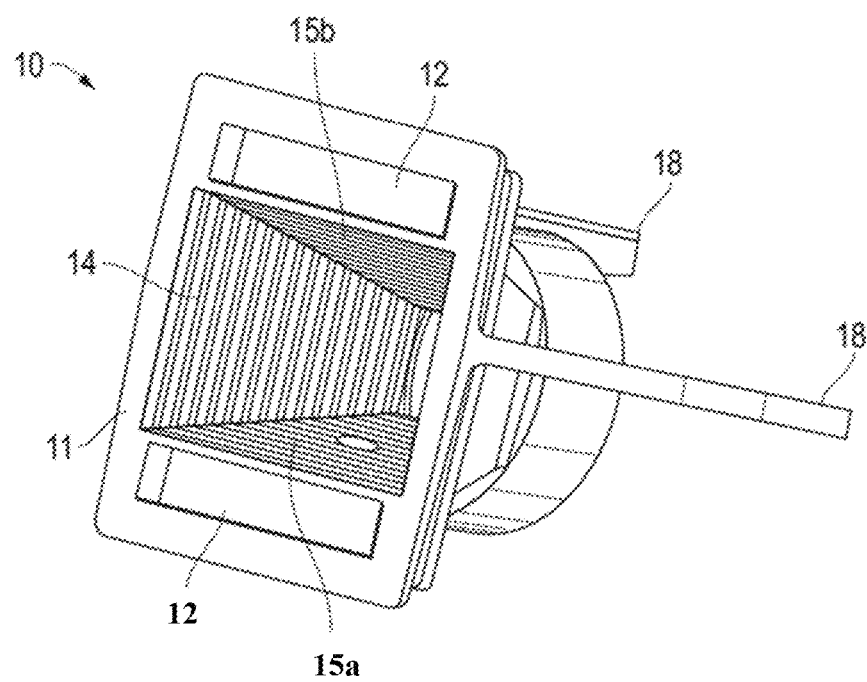
FIG. 2 is a perspective view of a main body of the heatable device.

FIG. 2 is a perspective view of the main body 11 of the heatable device 10.

Referring to FIG. 2, in the preferred embodiment, the main body 11 of the heatable device 10 may be substantially cone-shaped such that at least two opposing surfaces 15a, 15b of the interior cavity 14 defined in the main body 11 diverge relative to one another from one end of the main body 11 toward the other end of the main body 11, thereby permitting the image acquisition unit 5 to have a wide field of view extending through the interior cavity 14 and to the outside environment surrounding the vehicle. While the main body 11 of the heatable device 10 is shown and described as being substantially cone-shaped, it is to be understood that the main body 11 may be of any suitable shape and/or size and is not limited to being substantially cone-shaped.

The main body 11 of the heatable device 10 may include attachment arms 18 which may attach to the image acquisition unit 5, recesses 12 formed in a peripheral face of the main body 11, and an image acquisition unit receiving opening 16. The image acquisition unit receiving opening 16 may be capable of coupling with and receiving at least a portion of the image acquisition unit 5 and provides access to the interior cavity 14 of the heatable device 10. As non-limiting examples, the main body 11 may be formed or made from a material selected from the group consisting of glass-filled nylon, nylon 66, polycarbonate (PC), acrylonitrile butadiene styrene (ABS), and polycarbonate-acrylonitrile butadiene styrene (PC-ABS). The main body 11 may be, for example, formed by a manufacturing process such as injection molding.

FIG. 3 provides multiple views illustrating a breathable membrane 20 seated within a breather vent of the main body 11 of the heatable device 10. The breather vent may extend between the interior cavity 14 and an outer surface of the main body 11. The breather vent may include the breathable membrane 20 seated within the breather vent so that the breathable membrane 20 permits moisture or vapor within the interior cavity 14 to escape the interior cavity 14 while prohibiting moisture or vapor outside of the interior cavity 14 from re-entering the interior cavity 14 through the breathable membrane 20. As a non-limiting example, the breathable membrane may be formed or made from a material such as polytetrafluoroethylene (PTFE). The breather vent and corresponding breathable membrane 20 may be positioned anywhere between the interior cavity 14 and an outer surface of the main body 11. In this example, the breather vent and corresponding breathable membrane 20 are positioned on a top or bottom outer surface of the main body 11 of the heatable device 10.

Figure 4:
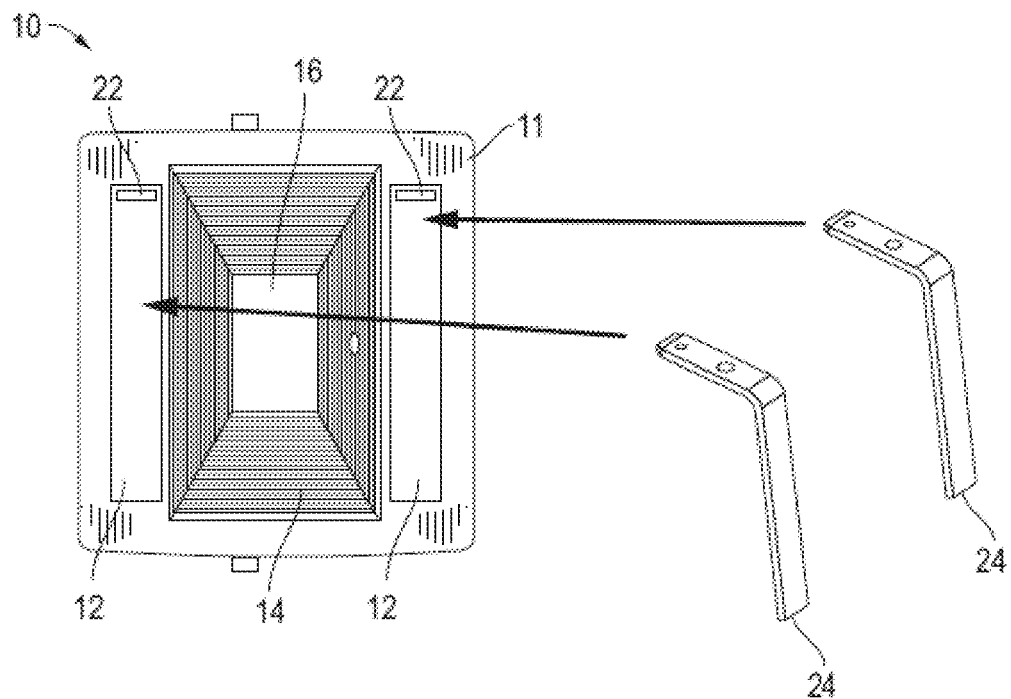
FIG. 4 is a front view of the main body of the heatable device illustrating busbars being inserted into recesses in a peripheral face of the main body.
Figure 5:
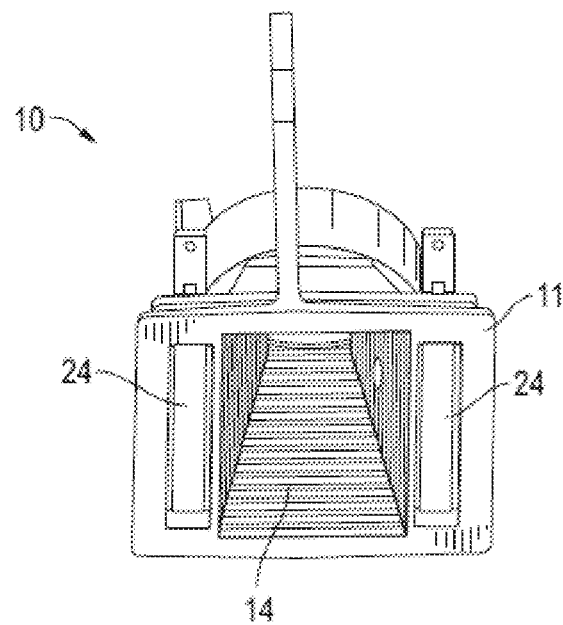
FIG. 5 is a front perspective view of the main body of the heatable device with the busbars seated into the recesses in the peripheral face of the main body.

FIG. 4 is a front view of the main body 11 of the heatable device 10 illustrating busbars 24 being inserted into the recesses 12 in the peripheral face of the main body 11. FIG. 5 is a front perspective view of the main body 11 of the heatable device 10 with the busbars 24 seated into the recesses 12 in the peripheral face of the main body 11.

Referring to FIGS. 4 and 5, the main body 11 of the heatable device 10 includes a pair of the recesses 12 with openings 22 disposed therein, one opening 22 in each recess 12. In this case, each of the openings 22 serve as busbar slots 22. The busbars 24 are placed into the recesses 12 of the main body 11, one in each recess 12, and an end of each of the busbars 24 is passed through each of the busbar slots 22 so that they extend from one side of the main body 11 towards the other side of the main body 11. While two recesses 12 are shown and described, any number of one or more recesses 12 may be employed in the peripheral face of the main body 11, and while each recess 12 includes one busbar slot 22, any number of one or more busbar slots 22 may be employed. Also, while two busbars 24 are shown and described, any number of one or more busbars 24 may be employed. The busbars 24 may be formed or made from an electrically-conductive material including silver, copper, copper-beryllium, gold, aluminum, zinc, nickel, brass, bronze, among other metals, and combinations thereof.

The recesses 12 in the peripheral face of the main body 11 and, in particular, the busbar slots 22 in the recesses 12, allow for external access to the busbars 24. The busbars 24 are therefore capable of being electrically connected to a vehicle-mounted power supply (not shown) and receiving electric current selectively provided by the vehicle-mounted power supply and conducting the electric current to an inner surface of the transparent glass substrate 32 (as will be further described herein). The inner surface of the transparent glass substrate 32 may be coated with a transparent electrically-conductive coating (as will be further described herein) which, in response to receiving electric current, selectively heats the transparent glass 32 substrate. Further details regarding the transparent glass substrate 32 are provided below and in reference to FIGS. 6-12.

Figure 6:
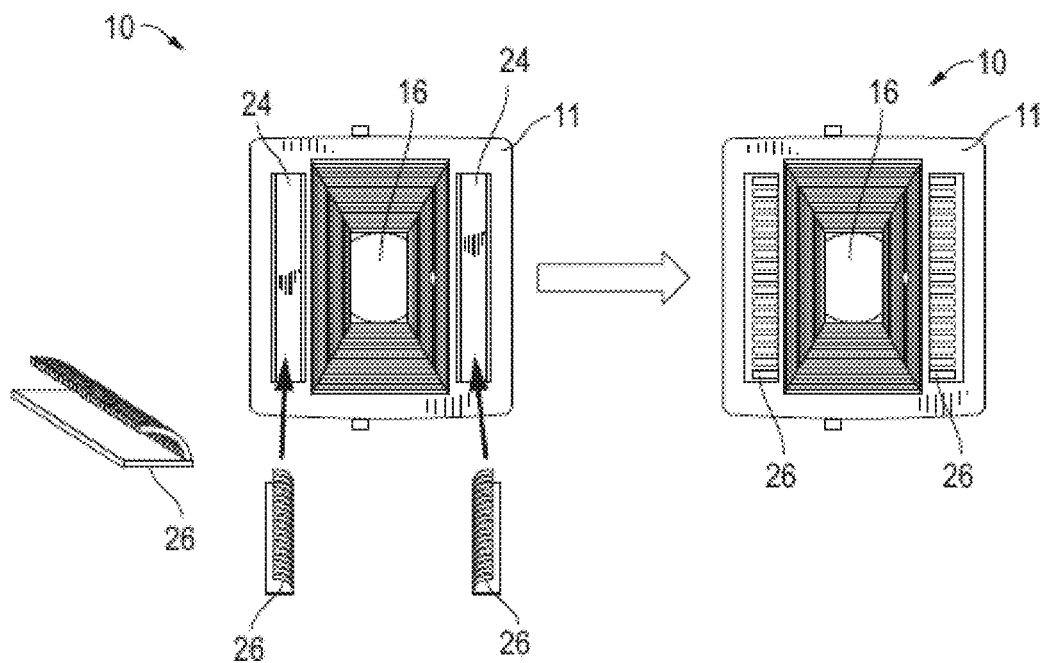
FIG. 6 provides multiple front views of the main body of the heatable device illustrating electrically-conductive contact springs being inserted and seated into the recesses in the peripheral face of the main body and positioned on the busbars.
Figure 7:
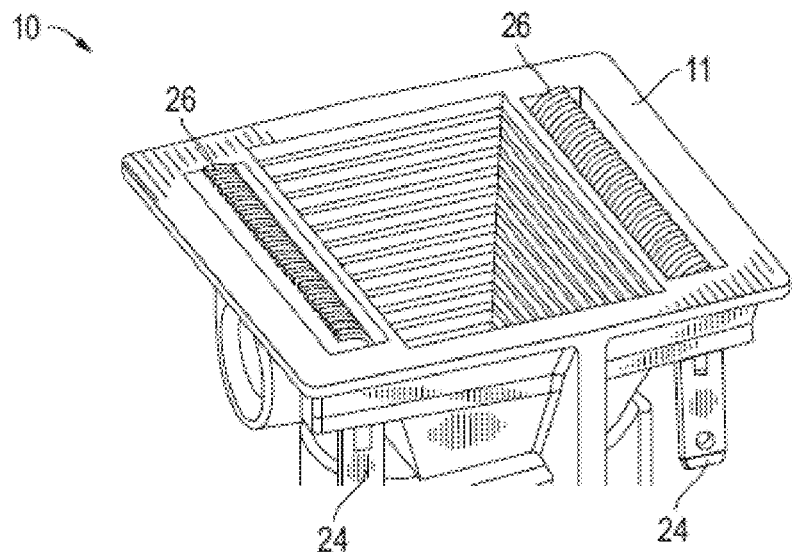
FIG. 7 is a front perspective view of the main body of the heatable device with the electrically-conductive contact springs seated into the recesses in the peripheral face of the main body and positioned on the busbars.

FIG. 6 provides multiple front views of the main body 11 of the heatable device 10 illustrating electrically-conductive contact springs 26 being inserted and seated into the recesses 12 in the peripheral face of the main body 11 and positioned on the busbars 24. FIG. 7 is a front perspective view of the main body 11 of the heatable device 10 with the electrically-conductive contact springs 26 seated into the recesses 12 in the peripheral face of the main body 11 and positioned on the busbars 24.

Referring to FIGS. 6 and 7, a first example of electrically-conductive elements which may be sandwiched or positioned in between the busbars 24 and the transparent glass substrate 32 are the electrically-conductive contact springs 26. Each of the busbars 24 and the corresponding electrically-conductive contact spring 26 together form a first example of an electrically-conductive unit. Each of the electrically-conductive units may be disposed at least partially outside of the interior cavity 14 defined in the main body 11 of the heatable device 10. Furthermore, each of the electrically-conductive units may be disposed entirely outside of the interior cavity 14 defined in the main body 11. Each of the electrically-conductive contact springs 26 may be positioned on top of each of the busbars 24. Each of the electrically-conductive contact springs 26 may be compressed between each of the busbars 24 and the inner surface of the transparent glass substrate 32. As such, each of the electrically-conductive contact springs 26 of each of the electrically-conductive units may directly contact the transparent electrically-conductive coating on the inner surface of the transparent glass substrate 32 to conduct the electric current flowing from the busbars 24 to the transparent glass substrate 32 to heat the transparent glass substrate 32. Each of the electrically-conductive contact springs 26 may be formed or made from a material including silver, copper, copper-beryllium, gold, aluminum, zinc, nickel, brass, bronze, among other metals, and combinations thereof.

Figure 8:
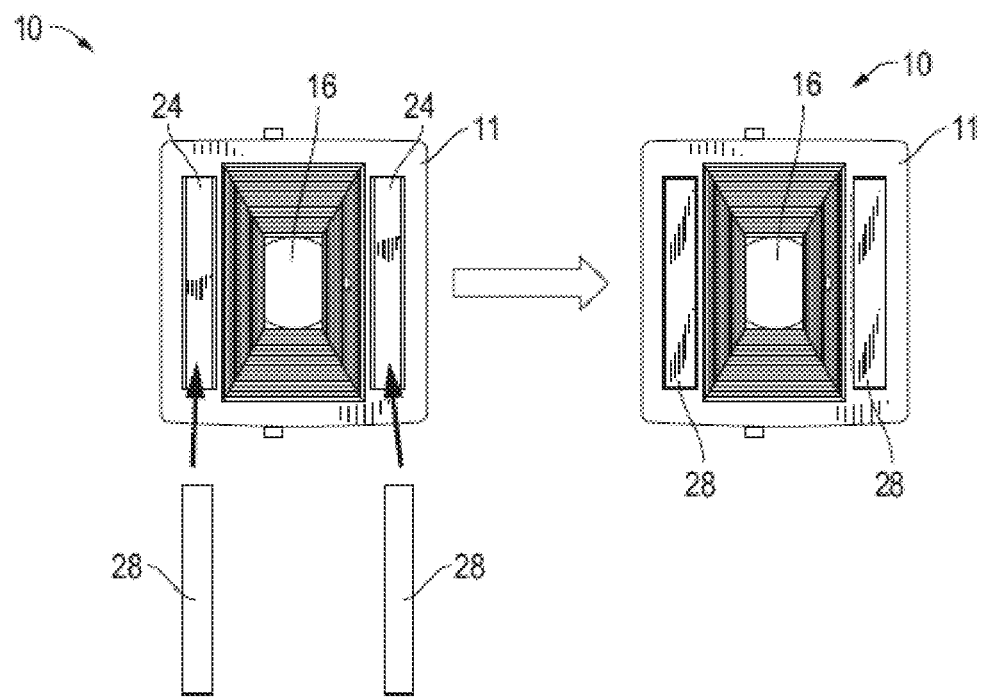
FIG. 8 provides multiple front views of the main body of the heatable device illustrating an electrically-conductive adhesive being inserted or filled into the recesses in the peripheral face of the main body and positioned on the busbars.
Figure 9:
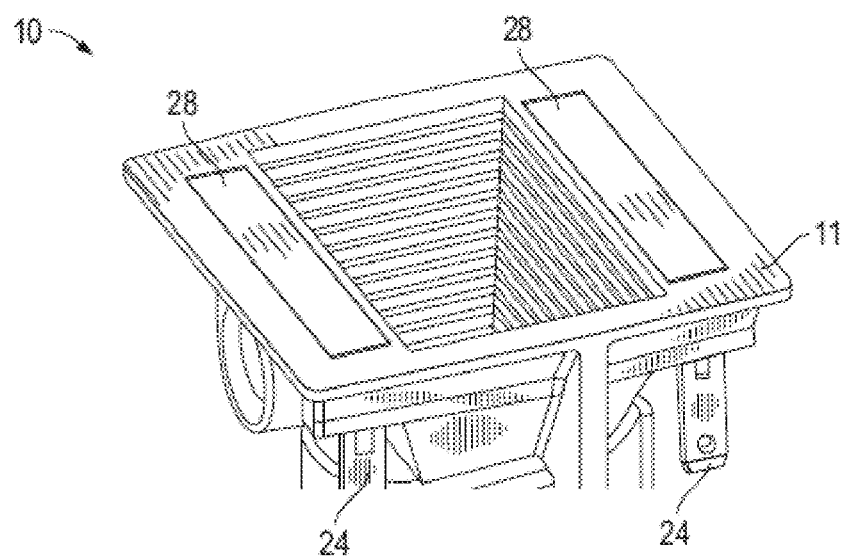
FIG. 9 is a front perspective view of the main body of the heatable device with the electrically-conductive adhesive seated or filled into the recesses in the peripheral face of the main body and positioned on the busbars.

FIG. 8 provides multiple front views of the main body 11 of the heatable device 10 illustrating an electrically-conductive adhesive 28 being inserted or filled into the recesses 12 in the peripheral face of the main body 11 and positioned on the busbars 24. FIG. 9 is a front perspective view of the main body 11 of the heatable device 10 with the electrically-conductive adhesive 28 seated or filled into the recesses 12 in the peripheral face of the main body 11 and positioned on the busbars 24.

Referring to FIGS. 8 and 9, another example of electrically-conductive elements which may be sandwiched or positioned in between the busbars 24 and the transparent glass substrate 32 is the electrically-conductive adhesive 28. Each of the busbars 24 and the corresponding electrically-conductive adhesive 28 together form a second example of an electrically-conductive unit. Each of the electrically-conductive units formed by one of the busbars 24 and corresponding electrically-conductive adhesive 28 may be disposed at least partially outside of the interior cavity 14 defined in the main body 11 of the heatable device 10. Furthermore, each of the electrically-conductive units formed by one of the busbars 24 and corresponding electrically-conductive adhesive 28 may be disposed entirely outside of the interior cavity 14 defined in the main body 11. The electrically-conductive adhesive 28 may be inserted or filled into each of the recesses 12 so as to be positioned on top of the busbars 24. By being disposed between the busbars 24 and the inner surface of the transparent glass substrate 32, the electrically-conductive adhesive 28 may directly contact the transparent electrically-conductive coating on the inner surface of the transparent glass substrate 32. The electrically-conductive adhesive 28 therefore may conduct the electric current flowing from the busbars 24 to the transparent glass substrate 32 to heat the transparent glass substrate 32.

FIG. 10 provides multiple front views of the main body 11 of the heatable device 10 illustrating a non-conductive adhesive 30 applied to the peripheral face of the main body 11 and an exemplary apparatus 31 capable of applying the non-conductive adhesive 30.

Referring to FIG. 10, in the preferred embodiment, after the electrically-conductive elements, in this case the electrically-conductive contact springs 26, are placed on the busbars 24, the non-conductive adhesive 30 may be applied to the peripheral face of the main body 11 of the heatable device 10. The non-conductive adhesive 30 may be a non-conductive ultraviolet (UV) light curable adhesive. The non-conductive adhesive 30 may be applied on the peripheral face of the main body 11 so as to be disposed adjacent to outer edges of an end of the main body 11 which the transparent glass substrate 32 is to be fixed. As shown in FIG. 10, an apparatus 31, such as a programmable or automated machine 31, may be employed to apply the non-conductive adhesive 30 to the main body 11 of the heatable device 10.

Figure 11:
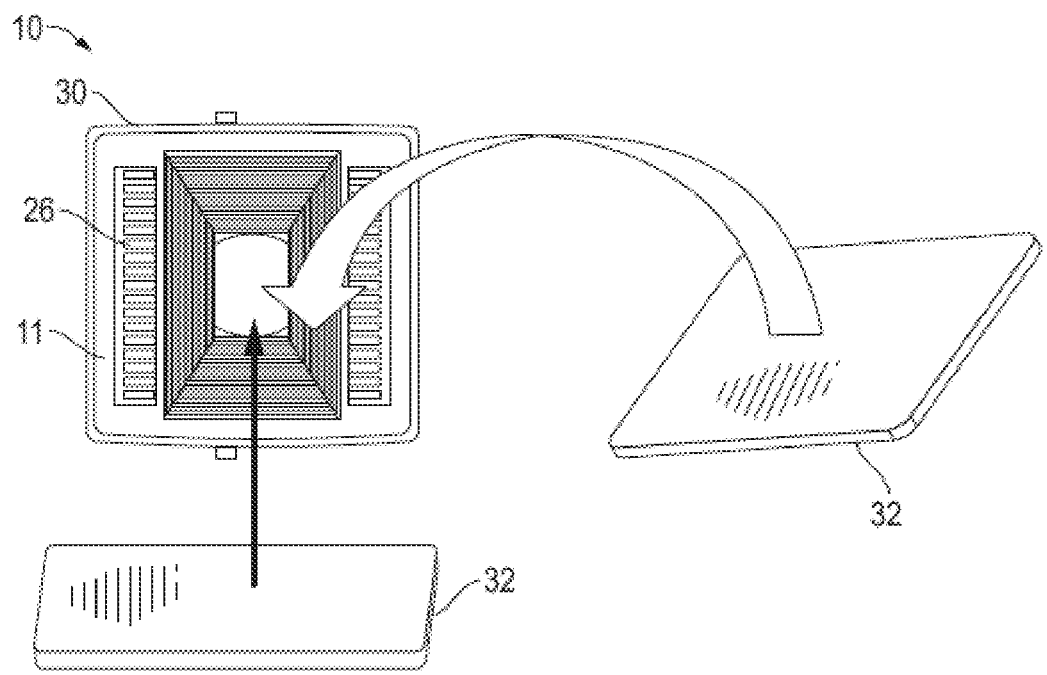
FIG. 11 is a front view of the main body of the heatable device as shown in FIG. 10 illustrating a transparent glass substrate being placed on the non-conductive adhesive to fix the transparent glass substrate to the main body.
Figure 12:
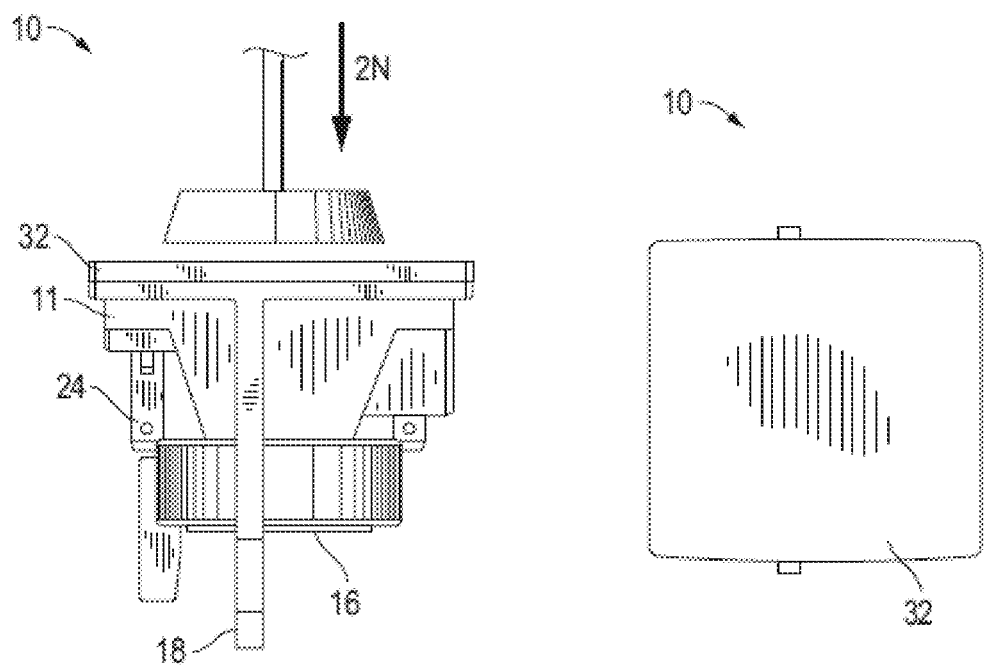
FIG. 12 provides multiple views of the main body of the heatable device illustrating the transparent glass substrate being pressed on the non-conductive adhesive to fix the transparent glass substrate to the main body.

FIG. 11 is a front view of the main body 11 of the heatable device 10, as shown in FIG. 10, illustrating the transparent glass substrate 32 being placed on the non-conductive adhesive 30 to fix the transparent glass substrate 32 to the main body 11. FIG. 12 provides multiple views of the main body 11 of the heatable device 10 illustrating the transparent glass substrate 32 being pressed on the non-conductive adhesive 30 to fix the transparent glass substrate 32 to the main body 11.

Referring to FIGS. 11 and 12, the transparent glass substrate 32 may be placed on the peripheral face of the main body 11 of the heatable device 10 at the end where the non-conductive adhesive 30 was applied so that the non-conductive adhesive 30 is disposed between the inner surface of the transparent glass substrate 32 and the peripheral face surrounding the opening of the interior cavity 14. As illustrated in FIG. 12, once the transparent glass substrate 32 is placed on the heatable device 10, it may be pressed down by a pressing element or pressing machine by a certain amount of force. In an example, a 2-Newton force is applied down on the transparent glass substrate 32. However, any suitable or appropriate amount of force may be used as may be determined by a person having ordinary skill in the art. As previously discussed, the inner surface of the transparent glass substrate 32 facing the end of the main body 11 may include the transparent electrically-conductive coating thereon. As a non-limiting example, the transparent electrically-conductive coating on the inner surface of the transparent glass substrate 32 may be an indium-tin-oxide (ITO) electrically-conductive coating. The transparent electrically-conductive coating on the inner surface of the transparent glass substrate 32 may be an electrically-conductive resistance heating coating and may further include a transparent anti-reflective (AR) coating on at least a portion of the inner surface thereof.

Furthermore, one or more contact portions (i.e. areas) of the inner surface of the transparent glass substrate 32 may directly contact the electrically-conductive element (e.g. the electrically-conductive contact spring 26 or electrically-conductive adhesive 28) of one or more of the electrically-conductive units. The one or more contact portions of the inner surface of the transparent glass substrate 32 may be devoid of the transparent anti-reflective (AR) coating to avoid adding unwanted electrical resistance to the transparent glass substrate 32 by overlaying the transparent electrically-conductive coating on the inner surface of the transparent glass substrate 32. The transparent glass substrate 32 may also include an anti-reflective (AR) coating on an outer surface thereof, the outer surface of the transparent glass substrate 32 facing away from the end of the main body 11 to which the transparent glass substrate 32 is fixed. As non-limiting examples, the transparent glass substrate 32 may be of various thicknesses and may include or be made of a borosilicate glass or a borosilicate float glass. Further, in response to the transparent glass substrate 32 being selectively heated, the transparent glass substrate 32 may be capable of reducing or eliminating fog, frost, snow, ice, water, or moisture on the outer surface thereof.

Figure 13:
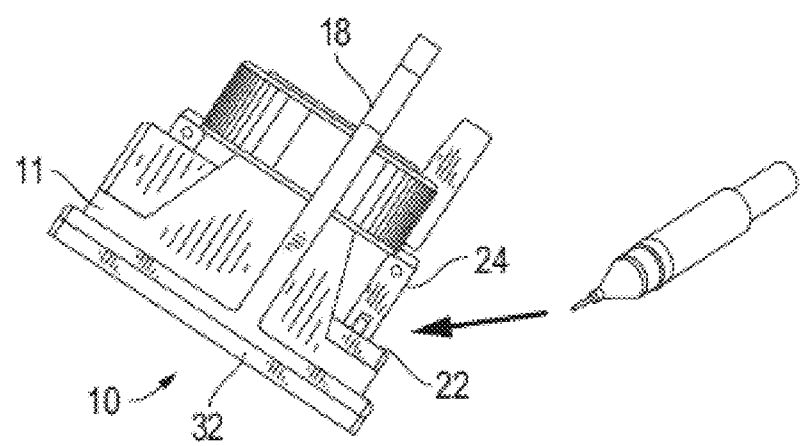
FIG. 13 is a side view of the heatable device illustrating a busbar slot of the main body being sealed with a sealant or adhesive.

FIG. 13 is a side view of the heatable device 10 illustrating one of the busbar slots 22 of the main body 11 being sealed with a sealant or adhesive. Referring to FIG. 13, after the transparent glass substrate 32 is placed on and fixed to the main body 11 of the heatable device 10, the heatable device 10 may be further sealed by a sealant or adhesive being applied at each of the busbar slots 22 to seal the busbar slots 22 from the outside environment. As a result, the interior cavity 14 of the main body 11 of the heatable device 10 may be hermetically sealed in its entirety once attached to the image acquisition unit 5 (as will be further described herein).

Figure 14:
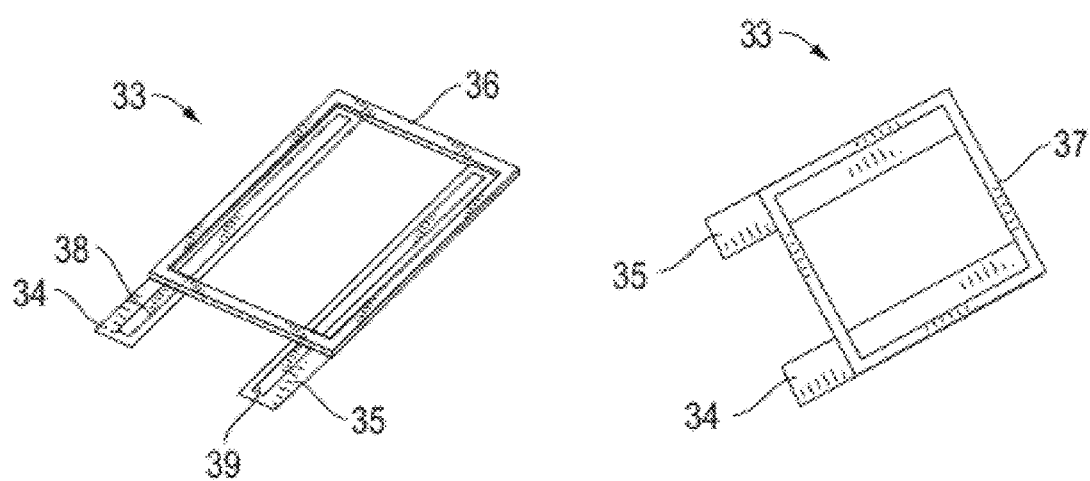
FIG. 14 provides front and rear perspective views of a one-piece assembly including busbars, non-conductive carriers, and non-conductive adhesive members.

FIG. 14 provides front and rear perspective views of an exemplary one-piece assembly 33 which may include further examples of electrically-conductive units, such as first and second electrically-conductive units (as will be further described herein), as part of the one-piece assembly 33. As such, another embodiment of the heatable device 10 may include the one-piece assembly 33 which may include a first non-conductive carrier 34 supporting a first electrically-conductive unit on an outer surface of the first non-conductive carrier 34 and a second non-conductive carrier 35 supporting the second electrically-conductive unit on an outer surface of the second non-conductive carrier 35. The one-piece assembly 33 may further include a first non-conductive double-sided adhesive member 36 fixed to the outer surfaces of the first and second non-conductive carriers 34, 35, the first non-conductive double-sided adhesive member 36 overlaying the first and second electrically-conductive units and bridging the first and second non-conductive carriers 34, 35. The one-piece assembly 33 may further include a second non-conductive double-sided adhesive member 37 fixed to inner surfaces of the first and second non-conductive carriers 34, 35 opposite the outer surfaces of the first and second non-conductive carriers 34, 35, the second non-conductive double-sided adhesive member 37 further bridging the first and second non-conductive carriers 34, 35. The first non-conductive double-sided adhesive member 36 may be further fixed to the inner surface of the transparent glass substrate 32 and the second non-conductive double-sided adhesive member 37 may be further fixed to the peripheral face of the main body 11 surrounding the opening of the interior cavity 14 at the end of the main body 11 to which the transparent glass substrate 32 is to be fixed, thereby fixing the transparent glass substrate 32 to the main body 11. It is to be understood, that in this example of the heatable device 10, at least the recesses 12 and busbar slots 22 may be eliminated from the peripheral face of the main body 11 so as to form a continuous substantially flat surface to which the second non-conductive double-sided adhesive member 37 may be fixed.

As shown in FIG. 14, as non-limiting examples, the first and second electrically-conductive units may include first and second metallic busbars 38, 39 screen-printed on the outer surfaces of the respective first and second non-conductive carriers 34, 35, the first and second metallic busbars 38, 39 each including a layer of electrically-conductive adhesive disposed thereon. The first and second metallic busbars 38, 39 are capable of being electrically connected to a vehicle-mounted power supply (not shown) and receiving electric current selectively provided by the vehicle-mounted power supply and conducting the electric current to the inner surface of the transparent glass substrate 32. Each of the first and second electrically-conductive units which include the respective first and second metallic busbars 38, 39 and layer of electrically-conductive adhesive may directly contact the transparent electrically-conductive coating on the inner surface of the transparent glass substrate 32 to conduct the electric current flowing from the first and second metallic busbars 38, 39 to the transparent glass substrate 32 to heat the transparent glass substrate 32. While first and second busbars 38, 39 are shown and described, it is to be understood that there may be a single metallic busbar or more than two busbars included in the one-piece assembly 33.

The first and second metallic busbars 38, 39 may each include or be formed from a material selected from the group consisting of silver, copper, copper-beryllium, gold, aluminum, zinc, nickel, brass, bronze, and combinations thereof.

Furthermore, the first and second non-conductive double-sided adhesive members 36, 37 may each include double-sided adhesive tape or a screen-printed adhesive layer.

Figure 15:
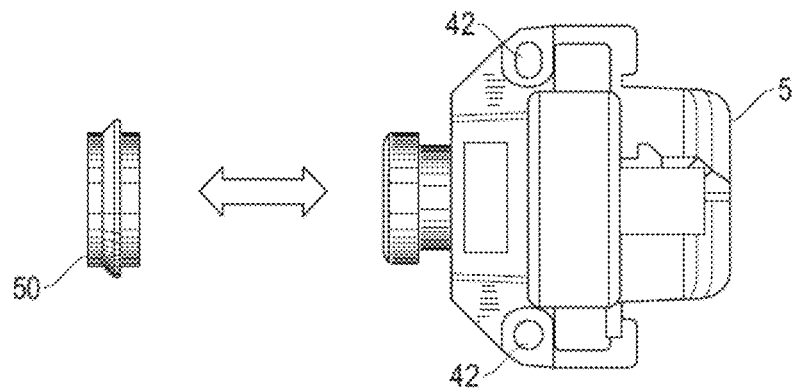
FIG. 15 is a top plan view of the image acquisition unit illustrating a sealing member being attached to a portion of the image acquisition unit.
Figure 16:
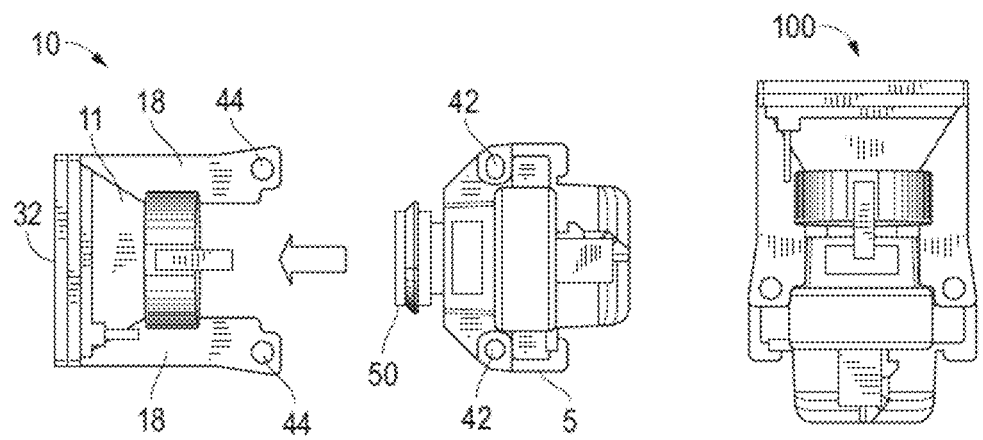
FIG. 16 provides top plan views of the image acquisition unit and the heatable device illustrating the image acquisition unit and sealing member attached thereto being coupled to the heatable device.
Figure 17:
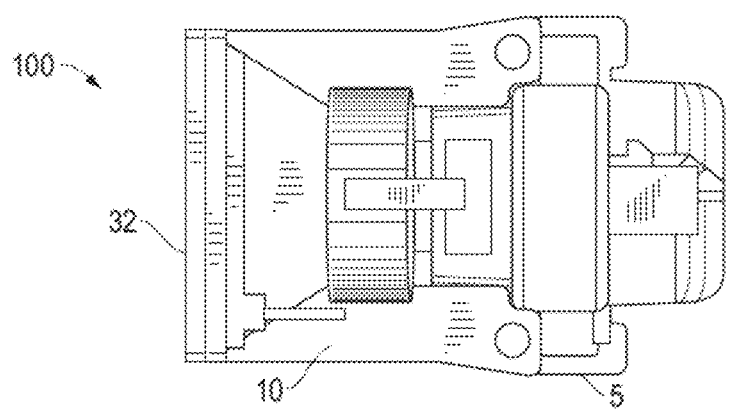
FIG. 17 is a top plan view of the assembly for mounting to a vehicle as shown in FIG. 1, the assembly including the image acquisition unit with the heatable device coupled thereto.

FIG. 15 is a top plan view of the image acquisition unit 5 illustrating a sealing member 50 being attached to a portion of the image acquisition unit 5. FIG. 16 provides top plan views of the image acquisition unit 5 and the heatable device 10 illustrating the image acquisition unit 5 and sealing member 50 attached thereto being coupled to the heatable device 10. FIG. 17 is a top plan view of the assembly 100 for mounting to a vehicle, as shown in FIG. 1, the assembly 100 including the image acquisition unit 5 with the heatable device 10 coupled thereto.

Referring to FIG. 15, the image acquisition unit 5 may be equipped (e.g. press fitted) with a sealing member 50 on an end or at least a portion (e.g. a lens barrel) thereof. The sealing member 50 may include or be formed from a rubber or a thermoplastic elastomer (TPE) material. In this example, the sealing member 50 is a grommet. The image acquisition unit 5 also includes image acquisition attachment members 42. For example, the image acquisition attachment members 42 may include holes, openings, projections, clips, hook and loop, adhesive, or other attachment features.

Referring now to FIGS. 16-17, the image acquisition unit 5 with the sealing member 50 fitted or placed thereon may be coupled to the heatable device 10 by the sealing member 50 being seated into or engaging with the image acquisition unit receiving opening 16 at the end of the heatable device 10 leading to the interior cavity 14, as illustrated in previously described figures. Furthermore, the heatable device 10 may include heatable device attachment members 44 which correspond to the image acquisition attachment members 42 and are formed on the attachment arms 18. For example, the heatable device attachment members 44 may include holes, openings, projections, clips, hook and loop, adhesive, or other attachment features. In certain examples, one or the other of the attachment members 42, 44 include a projection and a counterpart opening or a pair of counterpart openings. Additionally, in the case where the attachment members 42, 44 are holes or openings, the attachment members 42, 44 may receive fastening elements such as screws, pins or clips therethrough.

Figure 18:
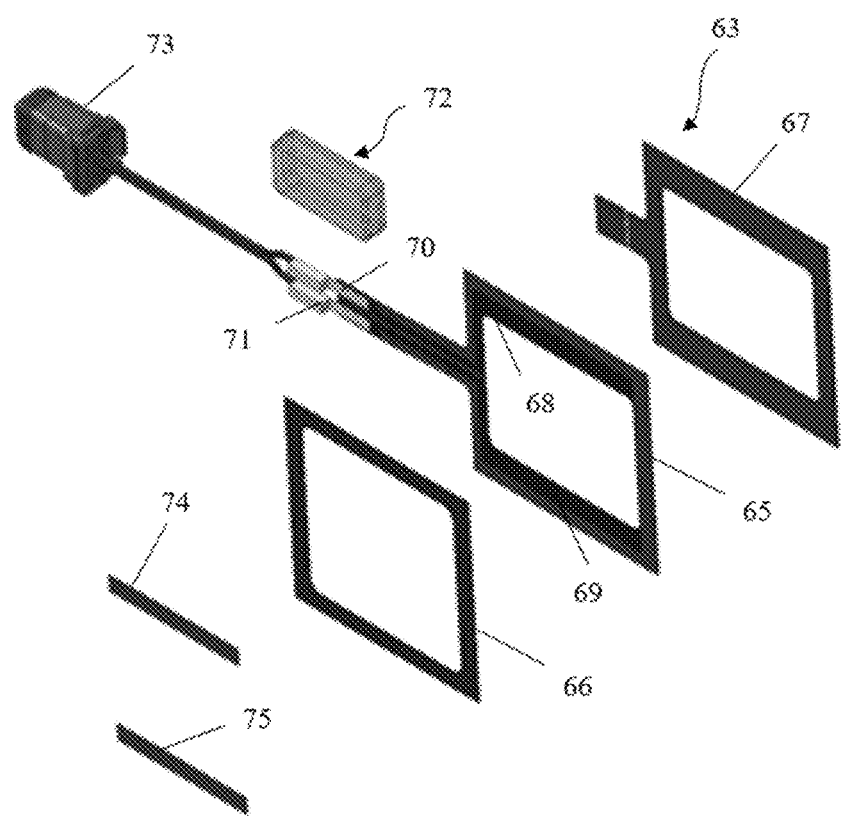
FIG. 18 is an explosion view of a further one-piece assembly including busbars, an non-conductive carrier and non-conductive adhesive members.

Referring now to FIGS. 18 to 21, showing a special embodiment of the heatable device 10 with an alternative one-piece assembly 63 to be further described with respect to FIG. 18 and to be connected to the main body 11 to which also the sealing member 50 and the image acquisition unit 5 is to be attached in order to provide the heatable device 10 as shown in FIGS. 20 and 21.

The one-piece assembly 63 comprises a non-conductive carrier 65 in form of a PE foil and carrying two busbars 68, 69. The busbars 68, 69 are AG screen printed on the non-conductive carrier 65. Further, the busbars 68, 69 are in electrical connection to a first crimped contact 70 and a second crimped contact 71, respectively. Said crimped contacts 70, 71 are protected by a crimped contact protection 72 and ensure an electric connection to a wire harness connector 73.

FIG. 18 also shows two non-conductive double-sided adhesive members 66, 67, with a first non-conductive double-sided adhesive member 66 being attached to the front side of the non-conductive carrier 65, such that it is not overlaying the busbars 68, 69. The busbars 68, 69 have a thickness ensuring that they project above the first non-conductive double-sided adhesive member 66 as soon as being attached to the non-conductive carrier 65.

The second non-conductive double-sided adhesive member 67 is attached to the rear side of the non-conductive carrier 65 as well as the two busbars 68, 69.

According to FIG. 19 the transparent glass substrate 32 can be attached to the one-piece assembly 63 via the first non-conductive double-sided adhesive member 66, whereas the attachment of the one-piece assembly 63 to the main body 11 is ensured via the second non-conductive double-sided adhesive member 67.

In some embodiments it might be necessary to ensure an electric contact between the busbars 68, 69 and the inner surface of the transparent glass substrate 32 by interposing two conductive double-sided adhesive members 74, 75, one associated with each busbar 68, 69.

The electrical contact between the busbars 68, 69 and the inner surface of the transparent glass substrate 32 can be further guaranteed by interposing pressure pads 80, 81 between the one-piece assembly 63 and the main body 11 as can be best seen in FIG. 21.

FIG. 21 also shows that the connection between the transparent glass substrate 32, the one-piece assembly 63 and the main body 11 can, in addition, be secured with the help of four clips 77 to 79.

It is to be stressed that neither the two conductive double-sided adhesive members 74,75, nor the two pressure pads 80, 81, nor the clips 76 to 79 are needed to implement the present invention.

Figure 22:
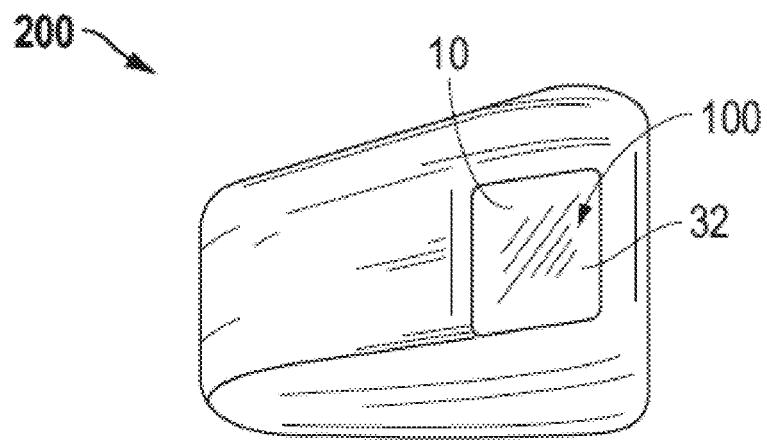
FIG. 22 is a perspective view of an exemplary housing for mounting to an exterior portion of a vehicle, at least a portion of the assembly as shown in FIG. 17 mounted within the housing.
Figure 23:
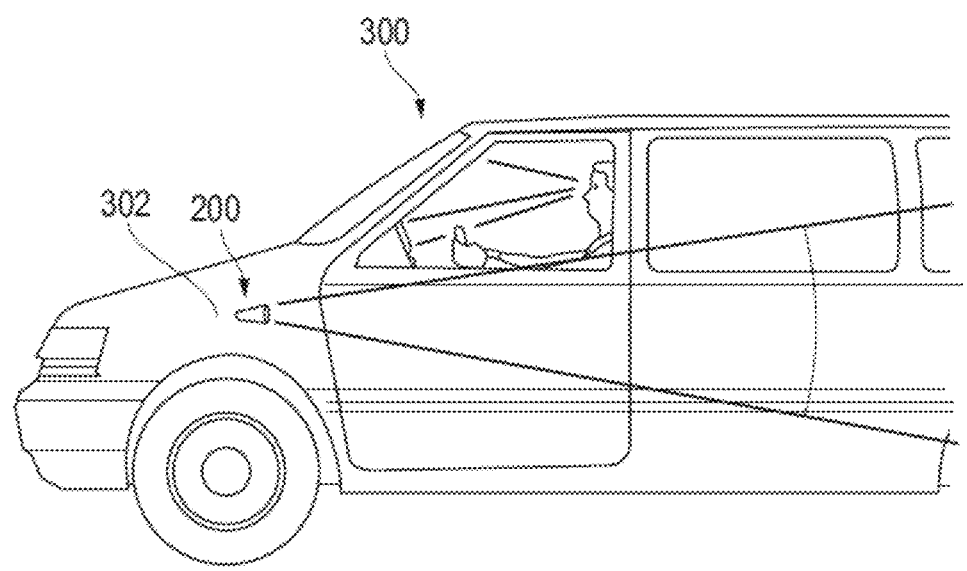
FIG. 23 is a side view of an exemplary vehicle including the housing as shown in FIG. 22 mounted to an exterior portion of the vehicle, at least a portion of the assembly as shown in FIG. 17 mounted within the housing and therefore mounted to the vehicle.

FIG. 22 is a perspective view of an exemplary housing 200 for mounting to an exterior portion 302 of an exemplary vehicle 300 (FIG. 23). At least a portion of the assembly 100, as shown e.g. in FIG. 17, may be mounted within the housing 200 to be protected from the outside environment, however, as illustrated in FIG. 22, the transparent glass substrate 32 of the heatable device 10 of the assembly 100 may be exposed to the outside environment. FIG. 23 is a side view of the exemplary vehicle 300 including the housing 200, as shown in FIG. 22, mounted to the exterior portion 302 of the vehicle 300. At least a portion of the assembly 100, as shown in FIG. 17, may be mounted within the housing 200 and therefore may be mounted to the vehicle 300. At least the heatable device 10 of the assembly 100 may be electrically connected to a vehicle-mounted power supply (not shown) of the vehicle 300, as previously described. As shown in FIG. 23, as a non-limiting example, in the case where the image acquisition unit 5 is a camera, the camera may have a wide field of view extending through the main body 11 of the heatable device 10 of the assembly 100 to capture or otherwise acquire images of the outside environment surrounding the vehicle 300. Such acquired images, or information relating thereto, may be transmitted to a display, a vehicle control unit, or to a driver of the vehicle 300 by various means in order to make the driver aware of their surroundings while driving or to impact control of the vehicle 300 automatically or manually.

Figure 24:
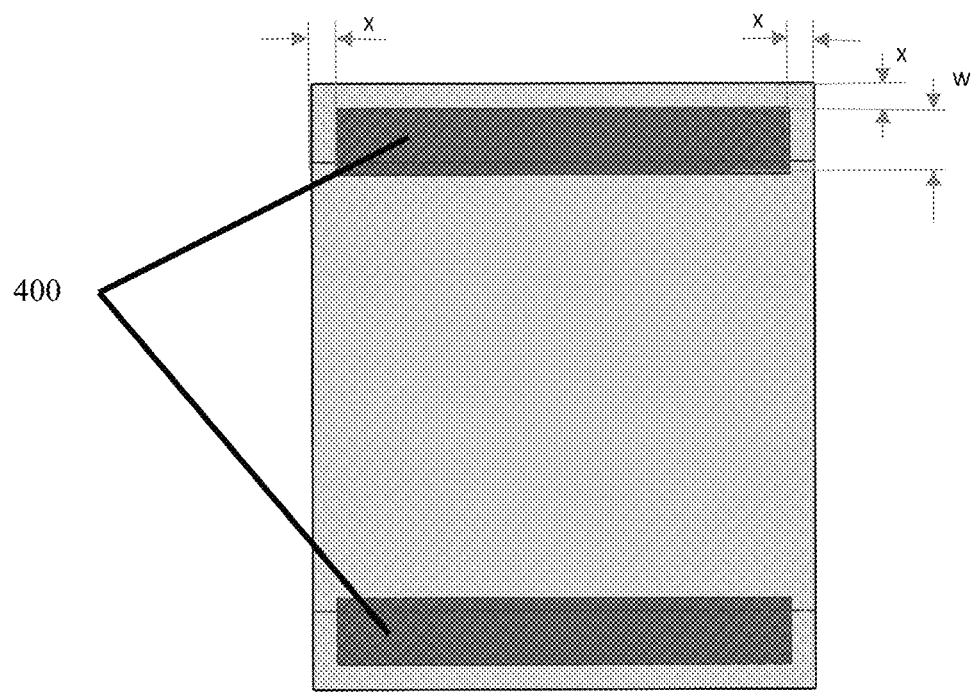

FIGS. 24-30 illustrate another example of a heatable device and a method of assembly thereof. In this example, a glass is provided with one or more contact foil stripes without having a transparent electrically-conductive coating. Referring to FIG. 24, one or more contact-support-foil strips 400 may be added to the cover glass. In an example, the strip of contact foil may be UV 2368.5046, and may be placed parallel over the conductive side of the glass. A gap clearance X may be spacing the glass edge from the contact foil 400, the contact foil 400 may have a width W. The gap clearance X may be 1.5 mm and the contact foil 400 width may be about 4 mm, but many other dimensions may be used.

Figure 25:
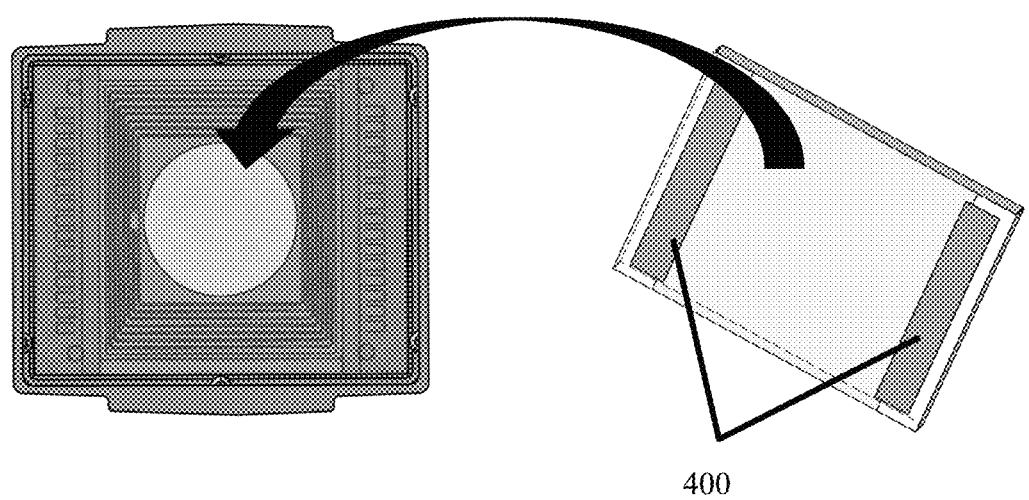
Figure 26:
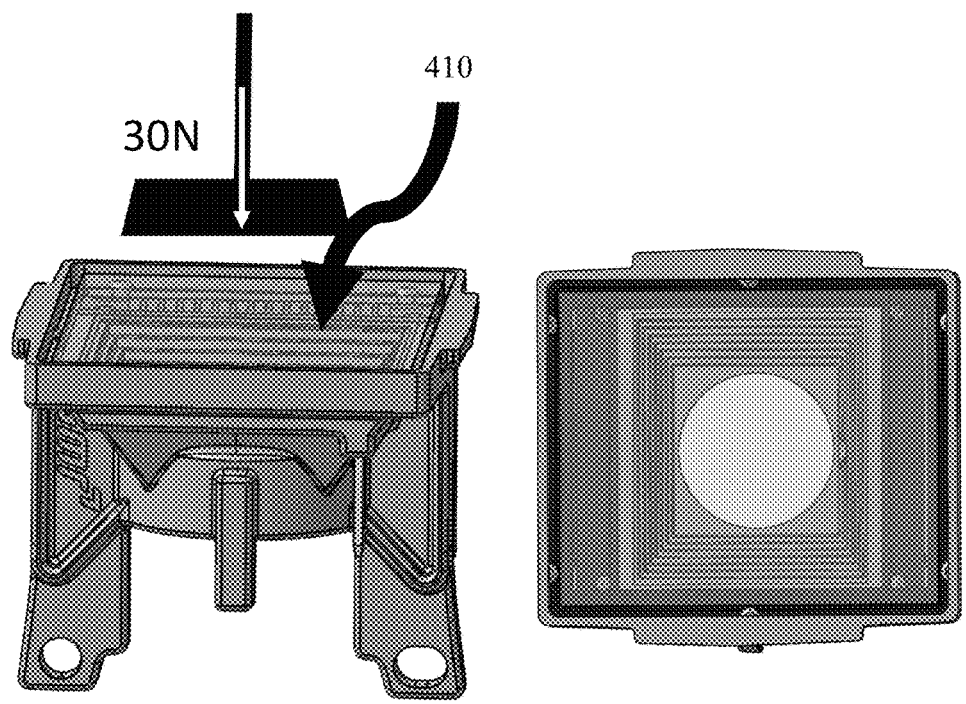

Referring to FIGS. 25 and 26, the glass part may first be cleaned under an air shower after the foil strip 400 may be added. Then the glass may be pressed to the cone with 30 N±5 N, or any other force value as known to a person of skill in the art, to keep the glass in place, as best shown in FIG. 26. A UV glue, for example UV 2368.1001, may be dispensed around the edges with a continuous bead (of glue) in 1×2 mm² slots between the glass edges and a perimeter of the cone. The total dispended volume over the length of 137 mm may be about 250 mm³; however, any amount of glue may be used and other configurations should be appreciated by a person of skill in the art. The glass can then be fixed in its position until UV hardening process is finished which may involve using a DELO UV light 410 for a duration of 45 seconds at 80% power setting; however, other UV hardening processes may be used such as using a different type of UV light for a different duration or at a different power setting.

Figure 27:
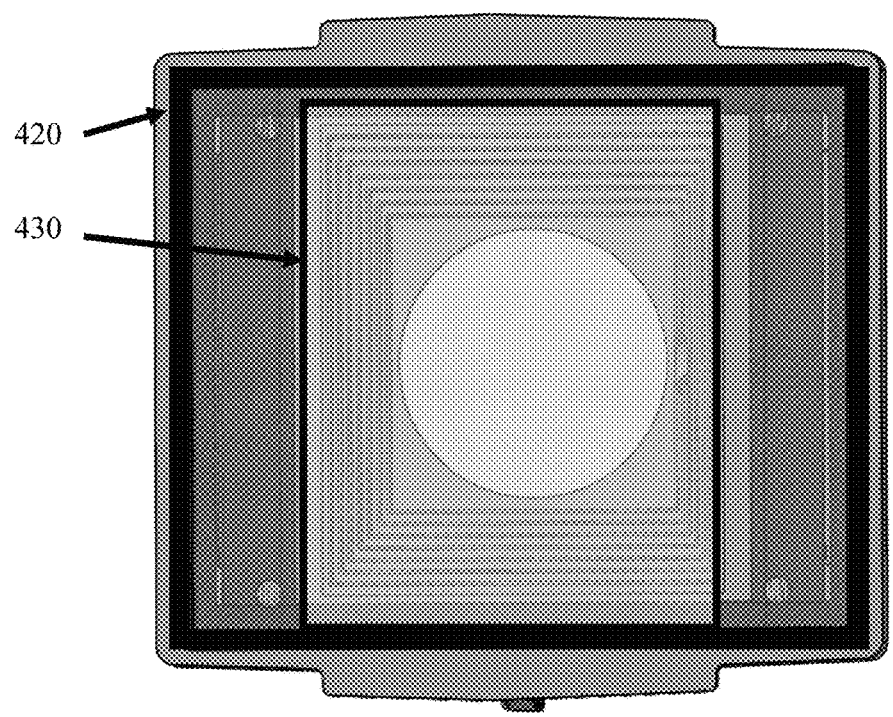

FIG. 27 illustrates the glass part after it is assembled and shows the glue bead 420 which was dispensed in the slots between the glass edges and a perimeter of the cone, as already described in context with FIG. 26. In addition, an area of view 430 is shown in which no dust, fingerprints, glue or other substances are permitted on the outside or the inside of the glass.

Figure 28:
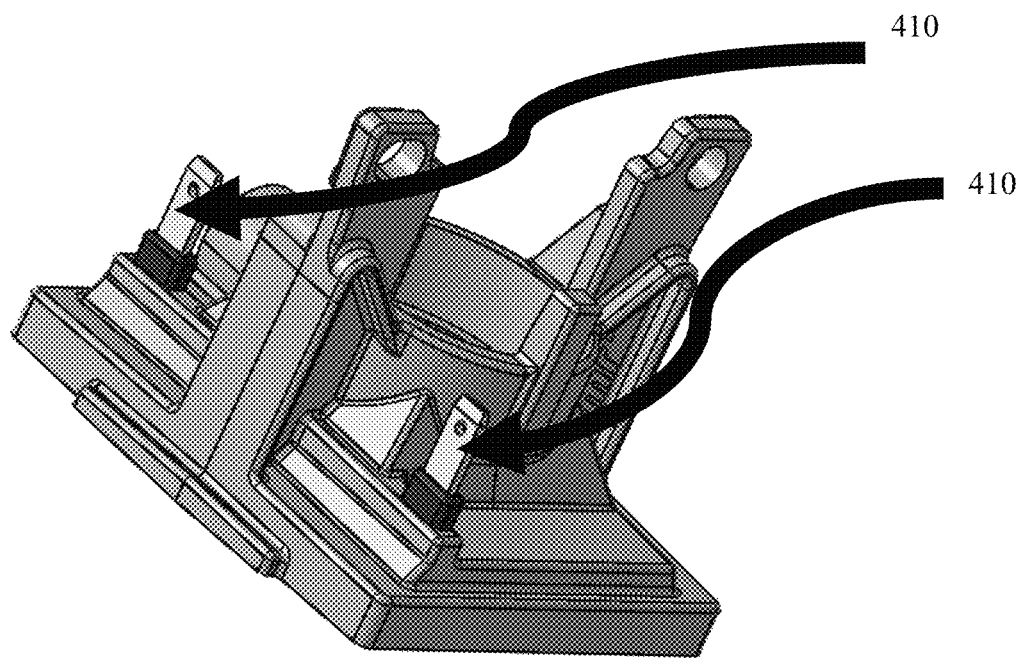

FIG. 28 shows the busbar and busbar slots already described in the context of other embodiments. In this example, the busbar slots may also be sealed with a UV glue, for example UV 2368.1001, without covering the contact areas (i.e., the edge portions of the busbars). In this example, UV light 410 may be applied for 20 sec on a power setting of 50% (for example, DELOLUX or DEOLUX 20 may be used). However, other UV hardening processes may be used such as using a different type of UV light for a different duration or at a different power setting.

Figure 29A:
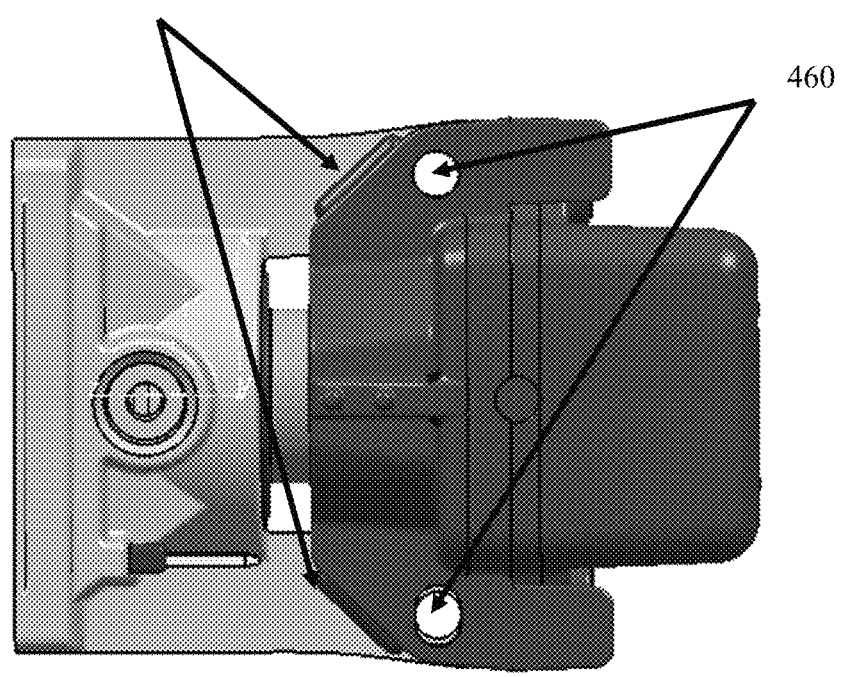
FIGS. 29A and 29B show attachment of the cone and a camera.
Figure 29B:
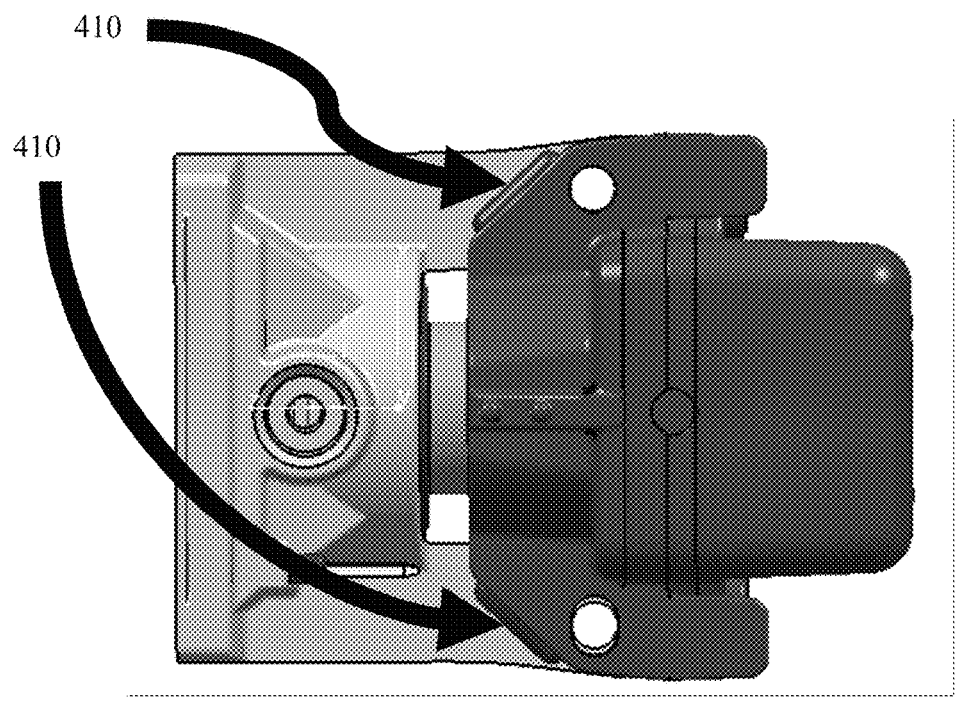

Referring to FIG. 29, the attachment of the cone and the camera may also use UV glue 440, such as DELO UV glue, at the edge interface between the cone and camera. First, the camera may be pushed into the cone until one or more alignment holes on the camera and one or more alignment holes on the cone are in alignments as shown at 460—in this example, the camera has a pair of alignment holes which overlap and align with a pair of alignment holes in the cone-shaped heatable device. Then, UV light 410 may be applied to the glue to cure the attachment of the UV glue 440. For example, 20 seconds at 50% power setting may be used; however, other UV hardening processes may be used such as using a different type of UV light for a different duration or at a different power setting.

Figure 30:
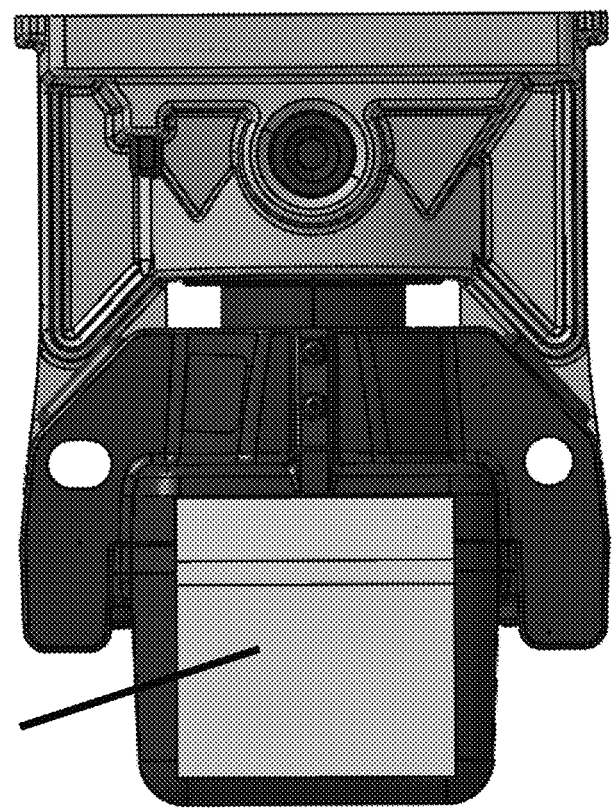

FIG. 30 illustrates using and attaching a heat sink pad 450 to the camera. In this example, the liner of the heat sink pad 450 may be removed, then the heat sink pad 450 may be attached to the bottom of the dedicated area and pressed according to the recommended manufacturer's level of force for heat sink pad 450.

It will be appreciated by those skilled in the art that changes could be made to the embodiments described above without departing from the broad inventive concept thereof. It is understood, therefore, that the present disclosure disclosed herein is not limited to the particular embodiments disclosed, and is intended to cover modifications within the spirit and scope of the present disclosure.

REFERENCE SIGN LIST 5 image acquisition unit
10 heatable device
11 main body
12 recesses
14 interior cavity 15a, 15b opposing surfaces
16 image acquisition unit receiving opening
18 attachment arms
20 breathable membrane
22 busbar slots
24 busbars
26 electrically-conductive contact springs
28 electrically-conductive adhesive
30 non-conductive adhesive
31 adhesive applying apparatus
32 transparent glass substrate
33 one-piece assembly
34 first non-conductive carrier
35 second non-conductive carrier
36 first non-conductive double-sided adhesive member
37 second non-conductive double-sided adhesive member
38 first metallic busbar
39 second metallic busbar
42 image acquisition unit attachment members
44 heatable device attachment members
50 sealing member
63 one-piece assembly
35 non-conductive carrier, PE foil
66 first non-conductive double-sided adhesive member
67 second non-conductive double-sided adhesive member
68 first busbar, AG screen printed
69 second busbar, AG screen printed
70 first crimped contact
71 second crimped contact
72 crimp contact protection
73 wire harness connector
74 first conductive double-sided adhesive member
75 second conductive double-sided adhesive member
76 clips
77 clips
78 clips
79 clips
80 pressure pad
81 pressure pad assembly
200 housing
300 vehicle
302 exterior portion of vehicle
400 contact-support-foil strips
410 DELO UV light
420 glue bead
430 area of view
440 UV glue
450 heat sink pad
460 aligned holes of image acquisition unit and heatable device

What is claimed is:

1. A heatable device for use with a vehicle-mounted image acquisition unit, the heatable device, comprising:
a main body including a first end, a second end opposite the first end, an interior cavity defined therein extending between the first and second ends, and a receiving portion disposed at the second end, the receiving portion including an opening therein providing access to the interior cavity;
a transparent glass substrate fixed to the main body at the first end and including a transparent electrically-conductive coating on an inner surface thereof, the inner surface of the transparent glass substrate facing the first end of the main body;
at least one electrically-conductive unit disposed at least partially outside of the interior cavity defined in the main body and contacting the transparent electrically-conductive coating on the inner surface of the transparent glass substrate, the at least one electrically-conductive unit configured to receive electric current selectively provided by a vehicle-mounted power supply and conduct the electric current to the transparent electrically-conductive coating on the inner surface of the transparent glass substrate, thereby selectively heating the transparent glass substrate; and
a sealing member configured to couple the opening in the receiving portion of the main body with at least a portion of a vehicle-mounted image acquisition unit such that the interior cavity defined in the main body is hermetically sealed and the vehicle-mounted image acquisition unit has a field of view extending through the interior cavity and through the transparent glass substrate to an outside environment surrounding a vehicle.

2. The heatable device according to claim 1, wherein the transparent glass substrate is fixed to the main body by way of a non-conductive adhesive, and wherein at least one of:
the non-conductive adhesive is a non-conductive ultraviolet (UV) light curable adhesive, or
the non-conductive adhesive comprises at least one non-conductive double-sided adhesive member.

3. The heatable device according to claim 2, wherein the non-conductive adhesive is disposed between the inner surface of the transparent glass substrate and a peripheral face of the main body, the peripheral face surrounding an opening of the interior cavity at the first end of the main body.

4. The heatable device according to claim 1, wherein
the transparent electrically-conductive coating on the inner surface of the transparent glass substrate is an indium-tinoxide (ITO) electrically-conductive coating, or
the transparent electrically-conductive coating on the inner surface of the transparent glass substrate is an electrically-conductive resistance heating coating.

5. The heatable device according to claim 1, wherein
the transparent glass substrate further includes a transparent anti-reflective (AR) coating on at least a portion of the inner surface thereof,
the transparent glass substrate further includes an anti-reflective (AR) coating on an outer surface thereof, the outer surface of the transparent glass substrate facing away from the first end of the main body, or
the transparent glass substrate further includes a transparent anti-reflective (AR) coating on at least a portion of the inner surface thereof and an anti-reflective (AR) coating on an outer surface thereof opposite the inner surface of the transparent glass substrate.

6. The heatable device according to claim 5, wherein
the at least one electrically-conductive unit contacts the transparent electrically-conductive coating on at least one contact portion of the inner surface of the transparent glass substrate, with the at least one contact portion being devoid of the transparent anti-reflective coating, or
the at least one electrically-conductive unit comprises at least two electrically-conductive units, the at least two electrically-conductive units contacting the transparent electrically-conductive coating on at least two contact portions of the inner surface of the transparent glass substrate which correspond to the at least two electrically-conductive units, respectively, with the at least two contact portions being devoid of the transparent anti-reflective (AR) coating.

7. The heatable device according to claim 1, wherein the transparent glass substrate comprises a borosilicate glass or a borosilicate float glass.

8. The heatable device according to claim 1, wherein in response to the transparent glass substrate being selectively heated, the transparent glass substrate is capable of reducing or eliminating at least one or more of fog, frost, snow, ice, water, and moisture on an outer surface thereof, the outer surface of the transparent glass substrate facing away from the first end of the main body.

9. The heatable device according to claim 1, wherein
the at least one electrically-conductive unit comprises a busbar disposed on the main body, wherein at least one of:
the busbar comprises a material selected from the group consisting of silver, copper, copper-beryllium, gold, aluminum, zinc, nickel, brass, bronze, and combinations thereof, or the busbar being screen printed.

10. The heatable device according to claim 9, wherein the at least one electrically-conductive unit further comprises:
an electrically-conductive contact spring compressed between the busbar and the inner surface of the transparent glass substrate, the electrically-conductive contact spring contacting the transparent electrically-conductive coating on the inner surface of the transparent glass substrate.

11. The heatable device according to claim 1, wherein
the at least one electrically-conductive unit comprises at least two electrically-conductive units disposed on the main body, and
the at least two electrically-conductive units each comprising a busbar.

12. The heatable device according to claim 11, wherein the main body further includes a peripheral face facing the inner surface of the transparent glass substrate, the peripheral face surrounding an opening of the interior cavity at the first end of the main body and including at least two spaced-apart recesses therein, and the at least two electrically-conductive units are disposed within the at least two spaced-apart recesses in the peripheral face, respectively.

13. The heatable device according to claim 11, wherein
the at least one electrically-conductive unit comprises first and second electrically-conductive units,
the heatable device further comprises a one-piece assembly comprising:
at least one non-conductive carrier supporting the first and second electrically-conductive units on an outer surface of the non-conductive carrier;
a first non-conductive double-sided adhesive member fixed to the outer surface of the at least one non-conductive carrier; and
a second non-conductive double-sided adhesive member fixed to the inner surface of the at least one non-conductive carrier opposite the outer surface thereof, and
wherein the first non-conductive double-sided adhesive member is further fixed to the inner surface of the transparent glass substrate and the second non-conductive double-sided adhesive member is further fixed to a peripheral face of the main body surrounding an opening of the interior cavity at the first end of the main body, thereby fixing the transparent glass substrate to the main body at the first end.

14. The heatable device according to claim 13, wherein
the second non-conductive double-sided adhesive member covers the non-conductive carrier and the first and second electrically-conductive units, in particular a first and a second busbar, and
the first non-conductive double-sided adhesive member covers only the non-conductive carrier.

15. The heatable device according to claim 14, wherein
the first and second busbars have a thickness of at least the thickness of the first non-conductive double-sided adhesive member, and
the first and second busbars each have a crimped contact to a wire harness connector, and the crimped contacts being covered by a crimp contact protection.

16. The heatable device according to claim 14, wherein at least one of
at least one pressure pad is arranged between the first and second busbars and the main body, or
at least one clip is securing the attachment of the transparent glass substrate and the main body.

17. The heatable device according to claim 13, wherein
a first non-conductive carrier supports the first electrically-conductive unit on an outer surface of the first non-conductive carrier and a second non-conductive carrier supports the second electrically-conductive unit on an outer surface of the second non-conductive carrier;
the first non-conductive double-sided adhesive member overlays the first and second electrically-conductive units and bridges the first and second non-conductive carriers; and
the second non-conductive double-sided adhesive member is fixed to inner surfaces of the first and second non-conductive carriers opposite the outer surfaces of the first and second non-conductive carriers, the second non-conductive double-sided adhesive member further bridging the first and second non-conductive carriers.

18. The heatable device according to claim 17, wherein the first and second electrically-conductive units comprise first and second metallic busbars screen-printed on the outer surfaces of the respective first and second non-conductive carriers, and
the metallic busbars each including a layer of electrically-conductive adhesive disposed thereon and contacting the transparent electrically-conductive coating on the inner surface of the transparent glass substrate.

19. The heatable device according to claim 13, wherein the first and second non-conductive double-sided adhesive members each comprise double-sided adhesive tape or a screen-printed adhesive layer.

20. The heatable device according to claim 1, wherein the main body is cone-shaped such that at least two opposing surfaces of the interior cavity diverge relative to one another from the second end of the main body toward the first end of the main body, thereby permitting the vehicle-mounted image acquisition unit to have a wide field of view extending through the interior cavity and through the transparent glass substrate to the outside environment surrounding the vehicle.

21. The heatable device according to claim 1, wherein
the main body further includes at least one attachment arm extending from an outer surface of the main body proximate the first end toward the second end of the main body, the at least one attachment arm being configured to attach to the vehicle-mounted image acquisition unit to secure the vehicle-mounted image acquisition unit to the heatable device, or
at least two attachment arms are provided.

22. The heatable device according to claim 1, wherein the main body comprises a material selected from the group consisting of glass-filled nylon, nylon 66, polycarbonate (PC), acrylonitrile butadiene styrene (ABS), and polycarbonate-acrylonitrile butadiene styrene (PC-ABS).

23. The heatable device according to claim 1, wherein
the main body further includes a breather vent extending between the interior cavity and an outer surface of the main body, the breather vent including a breathable membrane seated therein, the breathable membrane configured to permit moisture or vapor within the interior cavity to escape the interior cavity while prohibiting moisture or vapor outside of the interior cavity from re-entering the interior cavity through the breathable membrane, or
the breathable membrane comprises polytetrafluoroethylene (PTFE).

24. The heatable device according to claim 1, wherein the sealing member comprises a rubber or a thermoplastic elastomer (TPE), or the sealing member comprises a grommet.

25. The heatable device according to claim 1, wherein the vehicle-mounted image acquisition unit is selected from the group consisting of cameras, sensors, image sensors, optical sensors, laser sensors, and scanners.

26. A vehicle, comprising the heatable device according to claim 1, wherein the heatable device is mounted to an exterior portion of the vehicle.

27. The heatable device according to claim 1, further comprising one or more contact support foil strips on the transparent glass substrate placed parallel over the electrically-conductive side of the transparent glass substrate, wherein the one or more contact support foil strips comprise a UV activated adhesive.

28. The heatable device according to claim 27, wherein the one or more contact support foil strips each have a gap clearance being spaced from an edge of the glass substrate by about 1.5 mm, and each of the one or more contact support foil strips have a width of about 4 mm.

29. The heatable device according to claim 1, wherein the glass substrate is fixed to the heatable device by pressing the glass substrate into the heatable device and providing a continuous bead of glue dispensed around edges of the glass substrate and the heatable device in one or more slots on a perimeter of the heatable device, wherein the glue comprises a UV activated adhesive.

30. The heatable device according to claim 29, wherein at least one of:
the UV activated adhesive is configured to be activated by a DELO UV light which is applied for a duration of 45 seconds at 80% power setting, or
the glass substrate is pressed into the heatable device by a force of about 30 N.

31. The heatable device according to claim 1, further comprising one or more busbars and one or more busbar slots which are sealed with a UV activated adhesive without covering a contact area at an edge of each of the busbars.

32. The heatable device according to claim 31, wherein the UV activated adhesive is configured to be activated by a UV light which is applied for 20 sec at 50% power setting.

33. The heatable device according to claim 1, further comprising a heat sink pad which is attached to a bottom surface of the heatable device.

34. The heatable device according to claim 1, further comprising the image acquisition unit,
wherein the heatable device comprises one or more alignment holes and the image acquisition unit comprises one or more alignment holes, and the image acquisition unit is attached by being pushed into the heatable device until the one or more alignment holes of the image acquisition unit are aligned with the one or more alignment holes of the heatable device.

35. The heatable device according to claim 34, wherein the heatable device is attached to the image acquisition unit using a UV activated adhesive positioned between the heatable device and the image acquisition unit, the UV activated adhesive being configured to be activated by a UV light which is applied for 20 sec at 50% power setting.

36. A heatable device for use with a vehicle-mounted image acquisition unit, the heatable device, comprising:
a main body including a first end, a second end opposite the first end, an interior cavity defined therein extending between the first and second ends, and a receiving portion disposed at the second end, the receiving portion including an opening therein providing access to the interior cavity;
a transparent glass substrate fixed to the main body at the first end;
one or more electro-conductive foil strips on an inner surface of the transparent glass substrate, wherein the one or more foil strips comprise a UV activated adhesive and the inner surface of the transparent glass substrate faces the first end of the main body;
at least one electrically-conductive unit disposed at least partially outside of the interior cavity defined in the main body and contacting the one or more foil strips on the inner surface of the transparent glass substrate, the at least one electrically-conductive unit configured to receive electric current selectively provided by a vehicle-mounted power supply and conduct the electric current to the one or more foil strips on the inner surface of the transparent glass substrate, thereby selectively heating the transparent glass substrate;
one or more contact support foil strips on the transparent glass substrate placed parallel over the electrically-conductive side of the transparent glass substrate, wherein the one or more contact support foil strips comprise a UV activated adhesive; and
a sealing member configured to couple the opening in the receiving portion of the main body with at least a portion of a vehicle-mounted image acquisition unit such that the interior cavity defined in the main body is hermetically sealed and the vehicle-mounted image acquisition unit has a field of view extending through the interior cavity and through the transparent glass substrate to an outside environment surrounding a vehicle.

37. The heatable device according to claim 36, wherein the one or more contact support foil strips each have a gap clearance being spaced from an edge of the glass substrate by about 1.5 mm, and each of the one or more contact support foil strips have a width of about 4 mm.

38. The heatable device according to claim 36, wherein the glass substrate is fixed to the heatable device by pressing the glass substrate into the heatable device and providing a continuous bead of glue dispensed around edges of the glass substrate and the heatable device in one or more slots on a perimeter of the heatable device, wherein the glue comprises a UV activated adhesive.

39. The heatable device according to claim 38, wherein at least one of:
the UV activated adhesive is configured to be activated by a DELO UV light which is applied for a duration of 45 seconds at 80% power setting, or the glass substrate is pressed into the heatable device by a force of about 30 N.

40. The heatable device according to claim 36, further comprising one or more busbars and one or more busbar slots which are sealed with a UV activated adhesive without covering a contact area at an edge of each of the busbars.

41. The heatable device according to claim 40, wherein the UV activated adhesive is configured to be activated by a UV light which is applied for 20 sec at 50% power setting.

42. The heatable device according to claim 36, further comprising a heat sink pad which is attached to a bottom surface of the heatable device.

43. The heatable device according to claim 36, further comprising the image acquisition unit,
wherein the heatable device comprises one or more alignment holes and the image acquisition unit comprises one or more alignment holes, and the image acquisition unit is attached by being pushed into the heatable device until the one or more alignment holes of the image acquisition unit are aligned with the one or more alignment holes of the heatable device.

44. The heatable device according to claim 43, wherein the heatable device is attached to the image acquisition unit using a UV activated adhesive positioned between the heatable device and the image acquisition unit, the UV activated adhesive being configured to be activated by a UV light which is applied for 20 sec at 50% power setting.

45. A vehicle, comprising the heatable device according to claim 36, wherein the heatable device is mounted to an exterior portion of the vehicle.

46. The heatable device according to claim 10, wherein the electrically-conductive contact spring comprises a material selected from the group consisting of silver, copper, copper-beryllium, gold, aluminum, zinc, nickel, brass, bronze, and combinations thereof.

* * * * *